United States Patent
Fodor et al.

(10) Patent No.: US 12,341,591 B2
(45) Date of Patent: Jun. 24, 2025

(54) OVERHEAD REDUCTION IN FREQUENCY DIVISION DUPLEXING (FDD) MULTIPLE-INPUT MULTIPLE-OUTPUT (MIMO)

(71) Applicant: Telefonaktiebolaget LM Ericsson (publ), Stockholm (SE)

(72) Inventors: Gabor Fodor, Hässelby (SE); Flavio Maschietti, Antibes (FR); David Gesbert, Roquefort les Pins (FR)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 661 days.

(21) Appl. No.: 17/440,342

(22) PCT Filed: Feb. 18, 2020

(86) PCT No.: PCT/SE2020/050186
§ 371 (c)(1),
(2) Date: Sep. 17, 2021

(87) PCT Pub. No.: WO2020/197461
PCT Pub. Date: Oct. 1, 2020

(65) Prior Publication Data
US 2022/0200686 A1    Jun. 23, 2022

(51) Int. Cl.
*H04B 7/06* (2006.01)
*H04B 7/0456* (2017.01)

(52) U.S. Cl.
CPC ......... *H04B 7/0695* (2013.01); *H04B 7/0456* (2013.01); *H04B 7/063* (2013.01); *H04B 7/0639* (2013.01)

(58) Field of Classification Search
CPC .... H04B 7/0456; H04B 7/063; H04B 7/0639; H04B 7/0695
See application file for complete search history.

(56) References Cited

U.S. PATENT DOCUMENTS

| 2015/0304003 | A1 | 10/2015 | Fujishiro et al. |
| 2015/0373730 | A1 | 12/2015 | Fujishiro et al. |
| 2019/0364546 | A1* | 11/2019 | Kwak ................. H04L 5/0044 |

FOREIGN PATENT DOCUMENTS

| WO | 2018060551 A1 | 5/2018 |
| WO | 2019030281 A1 | 2/2019 |

OTHER PUBLICATIONS

Maschietti et al., Coordinated Beam Selection for Training Overhead Reduction in FDD Massive MIMO, 2019 16th International Symposium on Wireless Communication Systems (ISWCS), Oulu, Finland, Aug. 27-30, 2019, pp. 490-494 (Year: 2019).*

(Continued)

*Primary Examiner* — Brian P Cox
(74) *Attorney, Agent, or Firm* — Sage Patent Group

(57) ABSTRACT

A method, system and apparatus are disclosed. A first wireless device is provided. The first wireless device includes processing circuitry configured to: determine first beam information based at least in part on second beam information received from a second wireless device via device-to-device communications where the first beam information indicates a first beam selected by the first wireless device for downlink wireless communications, and where the second beam information indicates a second beam selected by the second wireless device for downlink wireless communications; and cause transmission of the first beam information for grid of beams precoder determination.

17 Claims, 13 Drawing Sheets

(56) References Cited

OTHER PUBLICATIONS

International search Report and Written Opinion dated May 8, 2020 for International Application No. PCT/SE2020/050186 filed Feb. 18, 2020, consisting of 9-pages.
3GPP TS 38.214 V15.2.0; 3rd Generation Partnership Project; Technical Specification Group Radio Access Network; NR; Physical layer procedures for data (Release 15), Jun. 2018, consisting of 95-pages.
3GPP TR 25.996 V15.0.0; 3rd Generation Partnership Project; Technical Specification Group Radio Access Network; Spatial channel model for Multiple Input Multiple Output (MIMO) simulations (Release 15), Jun. 2018, consisting of 40-pages.
Erik G. Larsson et al.; Massive MIMO for Next Generation Wireless Systems; IEEE Communications Magazine, Feb. 2014, consisting of 10-pages.
Jose Flordelis et al.; Massive MIMO Performance—TDD Versus FDD: What Do Measurements Say?; IEEE Transactions on Wireless Communications, vol. 17, No. 4, Apr. 2018, consisting of 15-pages.
Wolfgang Zirwas et al.; Key Solutions for a Massive MIMO FDD System; 2017 IEEE 28th Annual International Symposium on Personal, Indoor, and Mobile Radio Communications (PIMRC), 2017, consisting of 7-pages.

\* cited by examiner

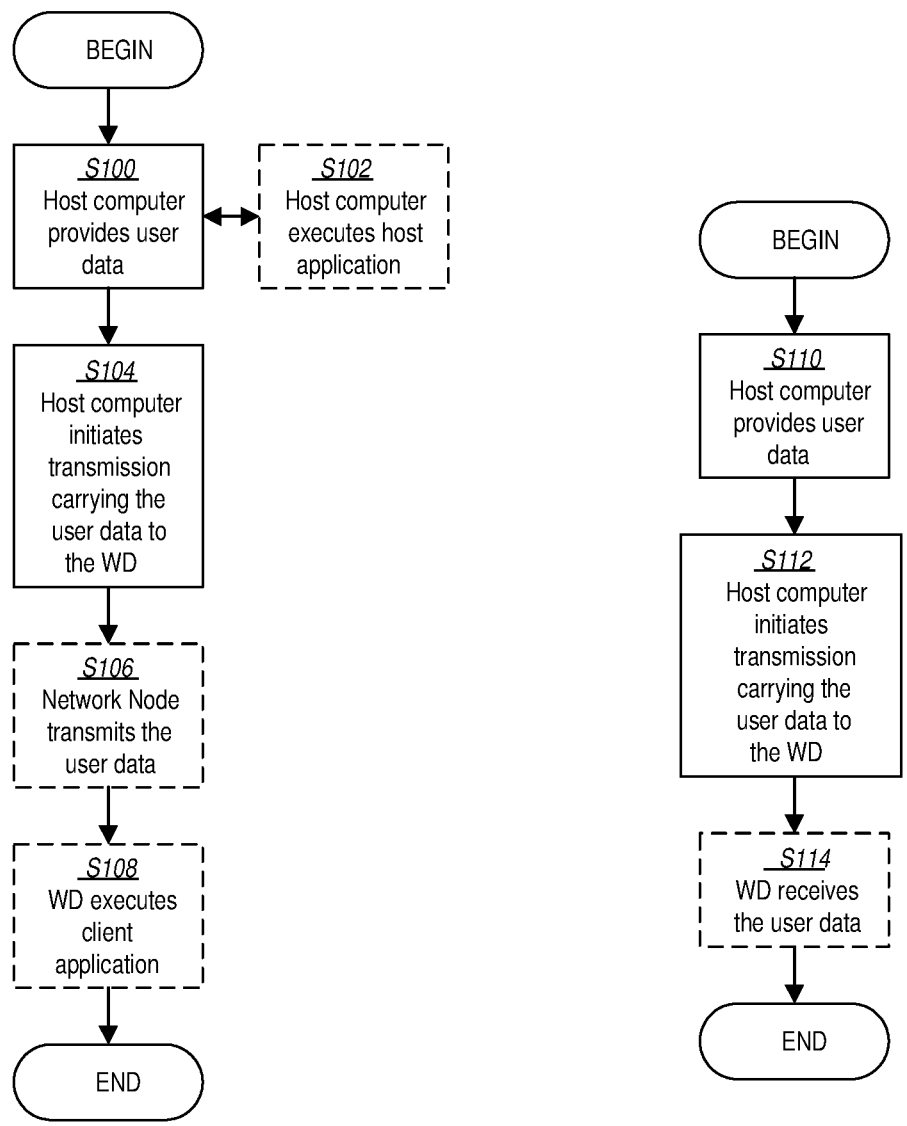

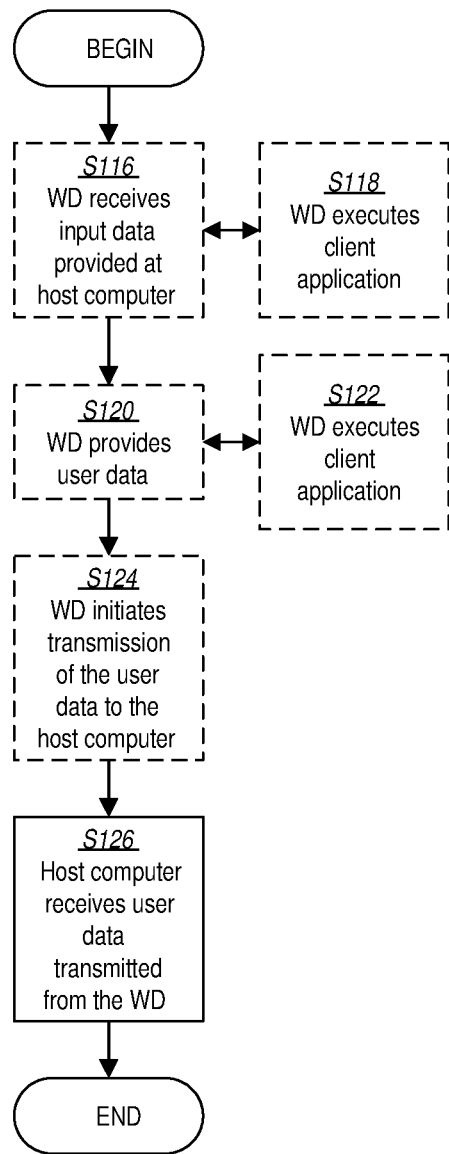
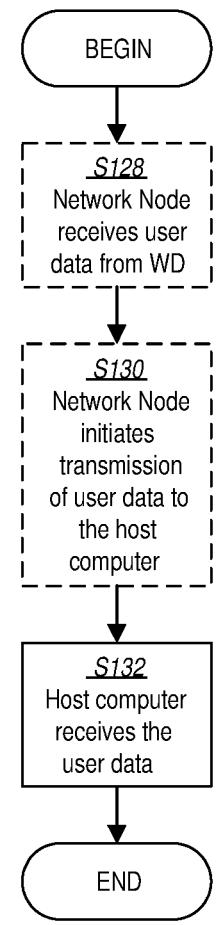
FIG. 5
FIG. 6

OVERHEAD REDUCTION IN FREQUENCY DIVISION DUPLEXING (FDD) MULTIPLE-INPUT MULTIPLE-OUTPUT (MIMO)

TECHNICAL FIELD

The present disclosure relates to wireless communications, and in particular, to beam selection based at least in part on beam information received via device-to-device communication.

BACKGROUND

Massive MIMO and Related Aspects

Massive Multiple-Input Multiple-Output (MIMO) (mMIMO) involves equipping the network node with a large number of antenna elements. This allows for increased beamforming and spatial multiplexing capabilities, reduced multi-user interference and improved cell-edge performance, compared to existing Multi-User MIMO.

The existing multi-user MIMO may be implemented in Time Division Duplexing (TDD), as TDD allows for estimation of the downlink channel through orthogonal uplink sounding signals, exploiting the reciprocity of the channel due to, for example, the TDD configuration. As a result, the overall training (i.e., channel estimation by using reference symbols) overhead is not proportional to the number of antennas at the network node side (which is large in the mMIMO regime), but may be proportional to the number of wireless devices and—eventually—to the number of antennas at the wireless device side (which is usually relatively small as compared to the network node). Since the complete channel state information (CSI) is made available at the network node side, linear precoders such as maximum ratio combining (MRC) and zero-forcing (ZF) can be derived and applied for spatially-multiplexed communications.

However, some existing networks operating in the sub-6 GHz band are implemented using frequency division duplexing (FDD), and mobile operators may prefer an FDD-based implementation of mMIMO to reduce the overall deployment, operation and maintenance costs. Channel reciprocity does not apply to FDD systems, and obtaining accurate downlink CSI for data precoding may be difficult. In particular, one training sequence may be needed for each antenna element. As an example, training 64 antenna elements using training sequences with length 7, with periodicity 5 ms, may lead to a training overhead greater than 50%. This may result in half of the channel resources being used for the purpose of channel estimation only. Also, these CSI measurements that are fed back to the network node may saturate the uplink channel with feedback.

The Grid-of-Beams Approach in FDD Massive MIMO

The Grid-of-Beams (GoB) approach has raised attention in the industry for reducing the training overhead in FDD mMIMO. The GoB is exploited to obtain a reduced effective channel representation through a spatial transformation, as, e.g., through discrete Fourier transform (DFT) beams. In particular, the training overhead becomes dependent on the size of such grid, as the network node may need to send training sequences over all the beams in the grid. Decreasing the number of beams in the grid corresponds to reducing the training overhead, but also results in an inaccurate effective channel, whose spatial multiplexing and beamforming capabilities are reduced as compared to the actual radio channel. Simulations in a realistic micro-cell scenario show that the reduction of the channel dimension may have an impact on the performance. In particular, about 40% loss in spectral efficiency with respect to TDD mMIMO is experienced when the targeted training overhead is 10%. In other words, existing GoB may impose drastic performance degradation.

To help avoid exchanging performance for overhead in existing GoB based implementations, one method involves using a large GoB with few activated beams. The beams bearing more power can be exploited to obtain a better representation of the channel in the real world. In general, in micro-cell scenarios, each wireless device experiences about 15 relevant beams when a codebook with size 128 is used. In this case, an 85% reduction in training overhead is achieved, with a small loss in rate performance. To further reduce overhead, GoB combining at the wireless device side can be exploited.

The current Third Generation Partnership Project (3GPP) standards for New Radio (NR) (also referred to as $5^{th}$ generation (5G), release 15) defines two structures for handling the GoB framework: (i) precoded training signals (CSI-RS) and (ii) the precoder matrix indicator (PMI). The former is used for the estimation of the effective channel, while the latter is fed back by the wireless devices to the network node to indicate a suitable set of beams to use for downlink transmission. In single-user MIMO (SU-MIMO), the network node can directly use the beam indicated in the reported PMI for subsequent data communication with the wireless device. In multi-user MIMO (MU-MIMO) instead, the transmission to a specific wireless device may, in general, may be a result of a joint decision over all the PMIs reported by all the wireless devices, in order to limit the multi-user interference. As a consequence, MU-MIMO may require more information as compared to SU-MIMO. In this respect, the current 3GPP release proposes a PMI reporting type supporting up to 4 beams and their respective amplitude and phase values. In practice, reporting more (relevant) beams translates to higher beamforming and spatial multiplexing capabilities, but also increased training and feedback overhead. In MU-MIMO scenarios, as each wireless device likely reports different PMIs, the total number of relevant beams increases and leads to the training overhead issue.

Scenario and Problem Description

Consider single-cell multi-user scenarios operating in FDD where both the network node and the wireless devices are equipped with more than one antenna and a GoB precoder/combiner. In particular, the network node is equipped with a large number of antennas (typically referred to as mMIMO) and employs a Multi-User MIMO precoder (prior to the GoB precoder) to enable spatial multiplexing on the same or overlapping time-frequency resources.

The general framework considers a smaller and a longer time-scale, namely:
- beam coherence time: the time interval where the second order statistics can be assumed to be static;
- channel coherence time: the time interval where the instantaneous channel coefficients can be assumed to be static.

On a beam coherence time basis, the wireless devices report their PMIs to the network node for GoB precoder design. On a channel coherence time basis, the network node sends precoded training signals for instantaneous effective CSI knowledge (through wireless device feedback).

In this scenario, the overhead due to channel estimation is proportional to the cardinality of the set union of all the reported PMIs. For even a moderate number of wireless devices, the spectral efficiency is severely degraded as compared to TDD mMIMO. The problem therefore includes the large channel estimation (training) overhead in FDD systems.

SUMMARY

Some embodiments advantageously provide methods, systems, and apparatuses for beam selection based at least in part on beam information received via device-to-device communication.

In one or more embodiments, the teachings of the disclosure exploit statistical beam selection under the GoB assumption to allow the wireless devices to excite a suitable channel subspace, with the aim of at least in part reducing the number of relevant channel components to be estimated in a multi-user scenario, for example.

In particular, coordination between the wireless devices is considered to help achieve the reduction. To facilitate coordination, an exchange mechanism exploiting low-overhead device-to-device (D2D) communication between the wireless devices is described herein. In detail, beam-related information such as PMI, for example, is exchanged across the wireless devices on a beam coherence time basis.

The cooperative scheme described herein helps at least in part provide an overall spectral efficiency gain over a non-cooperative benchmark algorithm in the order of 10%, for example, for slow-varying pedestrian channels. Such gain is increased up to 70%, for example, in vehicular scenarios where the shorter channel coherence time may require frequent channel training.

According to one aspect of the disclosure, a first wireless device is provided. The first wireless device includes processing circuitry configured to: determine first beam information based at least in part on second beam information received from a second wireless device via device-to-device communications where the first beam information indicates a first beam selected by the first wireless device for downlink wireless communications, and where the second beam information indicates a second beam selected by the second wireless device for downlink wireless communications. The processing circuitry is further configured to cause transmission of the first beam information for grid of beams precoder determination.

According to one or more embodiments of this aspect, the first beam information and second beam information correspond to respective precoding matrix indicators. According to one or more embodiments of this aspect, the first beam information includes at least one of an effective covariance, a rank indication and index of beam codebook. According to one or more embodiments of this aspect, the determination of the first beam information is based at least in part on a selection criteria that includes at least one of: a minimum channel gain associated with a beam; avoidance of multi-user interference compared to at least one other beam; maximize signal-to-interference noise ratio compared to at least one other beam; and a reduced in beam training overhead compared to at least one other beam.

According to one or more embodiments of this aspect, the processing circuitry is further configured to: receive at least one precoded training sequence that is based at least in part on the grid of beams precoder where the grid of beams precoder is based at in part on the first beam information and second beam information; estimate an effective channel between the first wireless device and a network node based at least in part on the received at least one precoded training sequence; and report the estimated effective channel to the network node for Multiple-Input Multiple-Output, MIMO, data precoder determination. According to one or more embodiments of this aspect, the receiving of the precoded training sequence and the reporting of the estimated effective channel are performed during a predefined channel coherence time period. According to one or more embodiments of this aspect, the first beam information is determined during a predefined beam coherence time period different from the predefined channel coherence time period. According to one or more embodiments of this aspect, the determination of the first beam information is based at least in part on third beam information received from a third wireless device via device-to-device communications where the third beam information indicates at least one beam selected by the third wireless device for wireless communications.

According to another aspect of the disclosure, a method implemented by a first wireless device is provided. First beam information is determined based at least in part on second beam information received from a second wireless device via device-to-device communications where the first beam information indicates a first beam selected by the first wireless device for downlink wireless communications, where the second beam information indicates a second beam selected by the second wireless device for downlink wireless communications. Transmission is caused of the first beam information for grid of beams precoder determination.

According to one or more embodiments of this aspect, the first beam information and second beam information correspond to respective precoding matrix indicators. According to one or more embodiments of this aspect, the first beam information includes at least one of an effective covariance, a rank indication and index of beam codebook. According to one or more embodiments of this aspect, the determination of the first beam information is based at least in part on a selection criteria that includes at least one of: a minimum channel gain associated with a beam; avoidance of multi-user interference compared to at least one other beam; maximize signal-to-interference noise ratio compared to at least one other beam; and a reduced in beam training overhead compared to at least one other beam.

According to one or more embodiments of this aspect, at least one precoded training sequence that is based at least in part on the grid of beams precoder is received where the grid of beams precoder is based at in part on the first beam information and second beam information. An effective channel between the first wireless device and a network node is estimated based at least in part on the received at least one precoded training sequence. The estimated effective channel to the network node is reported for Multiple-Input Multiple-Output, MIMO, data precoder determination. According to one or more embodiments of this aspect, the receiving of the precoded training sequence and the reporting of the estimated effective channel are performed during a predefined channel coherence time period. According to one or more embodiments of this aspect, the first beam information is determined during a predefined beam coherence time period different from the predefined channel coherence time period. According to one or more embodiments of this aspect, the determination of the first beam information is based at least in part on third beam information received from a third wireless device via device-todevice communications where the third beam information indicates at least one beam selected by the third wireless device for wireless communications.

According to another aspect of the disclosure, a network node in communication with a plurality of wireless devices is provided. The network node includes processing circuitry configured to: receive first beam information from a first wireless device of the plurality of wireless devices where the first beam information is based at least in part on second beam information associated with a second wireless device of the plurality of wireless devices, receive the second beam information from the second wireless device, and determine a grid of beams precoder based at least in part on the first beam information and the second beam information.

According to one or more embodiments of this aspect, the first beam information and second beam information correspond to respective pre-coding matrix indicators. According to one or more embodiments of this aspect, the first beam information includes at least one of an effective covariance, a rank indication and index of beam codebook. According to one or more embodiments of this aspect, the first beam information is based at least in part on a selection criteria includes at least one of: a minimum channel gain associated with a beam; avoidance of multi-user interference compared to at least one other beam; maximize signal-to-interference noise ratio compared to at least one other beam; and a reduced in beam training overhead compared to at least one other beam According to one or more embodiments of this aspect, the processing circuitry is further configured to: cause transmission of at least one precoded training sequence that is based at least in part on the grid of beams precoder; receive an estimate of an effective channel between the first wireless device and the network node that is based at least in part on the at least one precoded training sequence; receive a report of the estimated effective channel; and determine a Multiple-Input Multiple-Output, MIMO, data precoder based at least in part on the report of the estimated effective channel. According to one or more embodiments of this aspect, the transmission of the precoded training sequence and the receiving of reporting of the estimated effective channel occur during a predefined channel coherence time period.

According to one or more embodiments of this aspect, the first beam information is based at least in part on third beam information associated with a third wireless device where the third beam information indicates at least one beam selected by the third wireless device for wireless communications. According to one or more embodiments of this aspect, the processing circuitry is further configured to receive the third beam information from the third wireless device, and the gird of beams precoder being based at least in part on the third beam information.

According to another aspect of the disclosure, a method implemented in a network node that is in communication with a plurality of wireless devices is provided. First beam information is received from a first wireless device of the plurality of wireless devices where the first beam information is based at least in part on second beam information associated with a second wireless device of the plurality of wireless devices; receiving the second beam information from the second wireless device; and determining a grid of beams precoder based at least in part on the first beam information and the second beam information.

According to one or more embodiments of this aspect, the first beam information and second beam information correspond to respective pre-coding matrix indicators. According to one or more embodiments of this aspect, the first beam information includes at least one of an effective covariance, a rank indication and index of beam codebook. According to one or more embodiments of this aspect, the first beam information is based at least in part on a selection criteria includes at least one of: a minimum channel gain associated with a beam; avoidance of multi-user interference compared to at least one other beam; maximize signal-to-interference noise ratio compared to at least one other beam; and a reduced in beam training overhead compared to at least one other beam According to one or more embodiments of this aspect, transmission is caused of at least one precoded training sequence that is based at least in part on the grid of beams precoder. An estimate of an effective channel between the first wireless device and the network node that is based at least in part on the at least one precoded training sequence is received. A report of the estimated effective channel is received. A Multiple-Input Multiple-Output, MIMO, data precoder is determined based at least in part on the report of the estimated effective channel.

According to one or more embodiments of this aspect, the transmission of the precoded training sequence and the receiving of reporting of the estimated effective channel occur during a predefined channel coherence time period. According to one or more embodiments of this aspect, the first beam information is based at least in part on third beam information associated with a third wireless device where the third beam information indicates at least one beam selected by the third wireless device for wireless communications. According to one or more embodiments of this aspect, receiving the third beam information is received from the third wireless device. The gird of beams precoder is based at least in part on the third beam information.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein:

FIG. 3 is a flowchart illustrating exemplary methods implemented in a communication system including a host computer, a network node and a wireless device for executing a client application at a wireless device according to some embodiments of the present disclosure;

FIG. 4 is a flowchart illustrating exemplary methods implemented in a communication system including a host computer, a network node and a wireless device for receiving user data at a wireless device according to some embodiments of the present disclosure;

FIG. 5 is a flowchart illustrating exemplary methods implemented in a communication system including a host computer, a network node and a wireless device for receiving user data from the wireless device at a host computer according to some embodiments of the present disclosure;

FIG. 6 is a flowchart illustrating exemplary methods implemented in a communication system including a host computer, a network node and a wireless device for receiving user data at a host computer according to some embodiments of the present disclosure;

DETAILED DESCRIPTION

Figure 1:
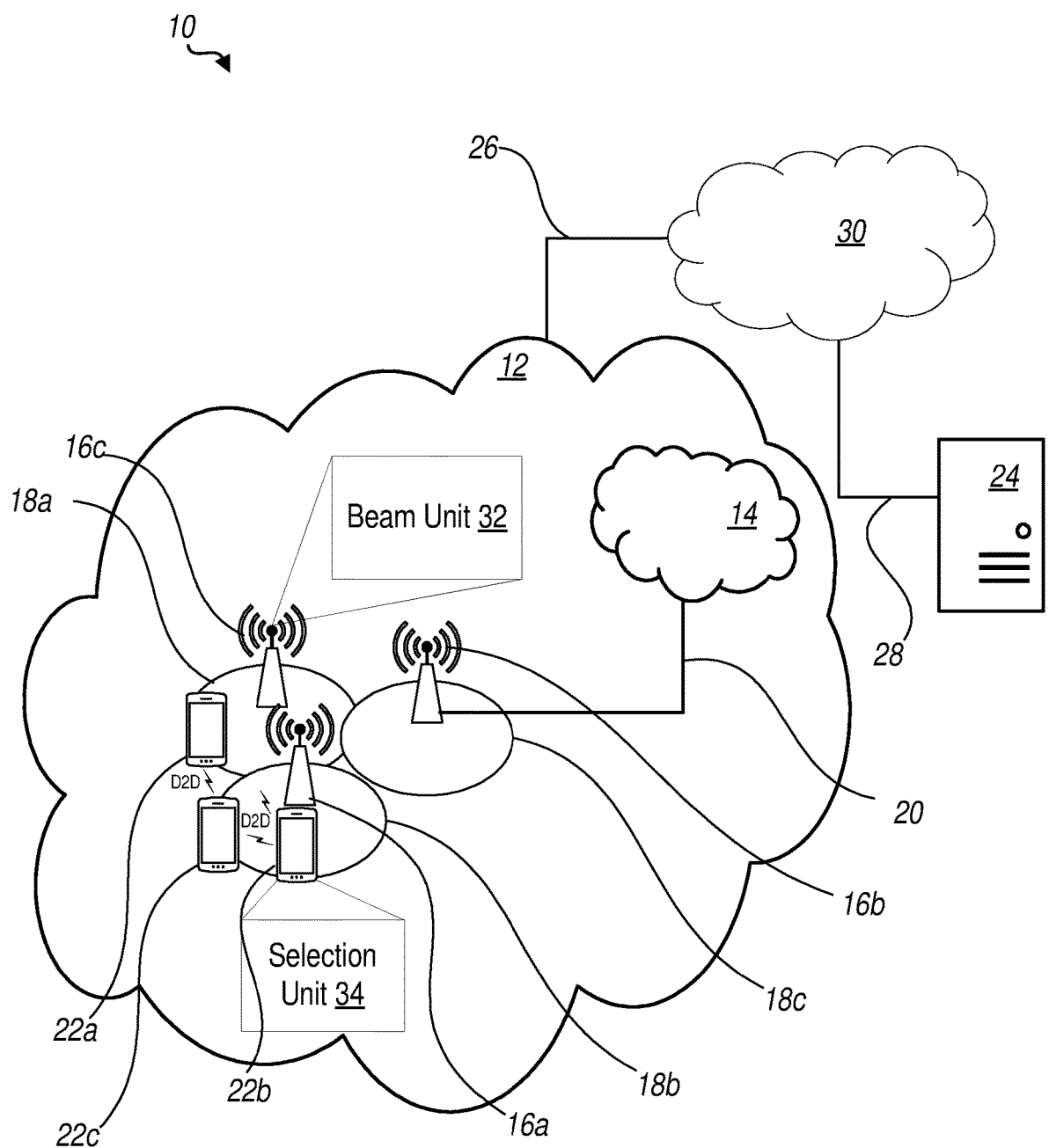
FIG. 1 is a schematic diagram of an exemplary network architecture illustrating a communication system connected via an intermediate network to a host computer according to the principles in the present disclosure.

Before describing in detail exemplary embodiments, it is noted that the embodiments reside primarily in combinations of apparatus components and processing steps related to beam selection based at least in part on beam information received via device-to-device communication. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IOT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

Note that although terminology from one particular wireless system, such as, for example, Third Generation Partnership Project (3GPP) Long Term Evolution (LTE) and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

An indication generally may explicitly and/or implicitly indicate the information it represents and/or indicates. Implicit indication may for example be based on position and/or resource used for transmission. Explicit indication may for example be based on a parametrization with one or more parameters, and/or one or more index or indices, and/or one or more bit patterns representing the information. It may in particular be considered that control signaling as described herein, based on the utilized resource sequence, implicitly indicates the control signaling type.

Transmitting in downlink may pertain to transmission from the network or network node to the wireless device. Transmitting in uplink may pertain to transmission from the wireless device to the network or network node. Transmitting in sidelink may pertain to (direct) transmission from one wireless device to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

D2D communication (sidelink communication) may comprise transmission and/or reception of data. It may be considered that D2D communication may generally comprise and/or be defined by data being transmitted from one terminal, e.g. the transmitter or transmitter terminal, (in particular directly) to another terminal, e.g. the receiver or receiver terminal, in particular without the data transmitted being transmitted and/or relayed via a cellular network and/or base station or radio node of such. D2D communication may comprise relaying and/or hopping via a plurality of terminals. It may be considered that D2D communication is supported by a network, e.g. by the network and/or base station or radio node providing resource allocation, e.g. allocating resource pools for D2D communication. D2D communication may for example comprise D2D discovery transmission and/or D2D data transmission (the data may in particular be user data and/or payload data). Generally, D2D transmissions may be provided on resources used for UL and/or DL transmissions in cellular communication. However, in some variants, the resources may be UL resources (in the cellular context), e.g. as determined by a standard like LTE.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments provide for beam selection based at least in part on beam information received via device-to-device communication.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16c. A second WD 22b in coverage area 18b is wirelessly connectable to the corresponding network node 16a. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The communication system 10 may itself be connected to a host computer 24, which may be embodied in the hardware and/or software of a standalone server, a cloud-implemented server, a distributed server or as processing resources in a server farm. The host computer 24 may be under the ownership or control of a service provider, or may be operated by the service provider or on behalf of the service provider. The connections 26, 28 between the communication system 10 and the host computer 24 may extend directly from the core network 14 to the host computer 24 or may extend via an optional intermediate network 30. The intermediate network 30 may be one of, or a combination of more than one of, a public, private or hosted network. The intermediate network 30, if any, may be a backbone network or the Internet. In some embodiments, the intermediate network 30 may comprise two or more sub-networks (not shown).

The communication system of FIG. 1 as a whole enables connectivity between one of the connected WDs 22a, 22b and the host computer 24. The connectivity may be described as an over-the-top (OTT) connection. The host computer 24 and the connected WDs 22a, 22b are configured to communicate data and/or signaling via the OTT connection, using the access network 12, the core network 14, any intermediate network 30 and possible further infrastructure (not shown) as intermediaries. The OTT connection may be transparent in the sense that at least some of the participating communication devices through which the OTT connection passes are unaware of routing of uplink and downlink communications. For example, a network node 16 may not or need not be informed about the past routing of an incoming downlink communication with data originating from a host computer 24 to be forwarded (e.g., handed over)

to a connected WD 22a. Similarly, the network node 16 need not be aware of the future routing of an outgoing uplink communication originating from the WD 22a towards the host computer 24.

A network node 16 is configured to include a beam unit 32 which is configured to perform one or more functions described. A wireless device 22 is configured to include a selection unit 34 which is configured to perform one or more functions described herein.

Example implementations, in accordance with an embodiment, of the WD 22, network node 16 and host computer 24 discussed in the preceding paragraphs will now be described with reference to FIG. 2. In a communication system 10, a host computer 24 comprises hardware (HW) 38 including a communication interface 40 configured to set up and maintain a wired or wireless connection with an interface of a different communication device of the communication system 10. The host computer 24 further comprises processing circuitry 42, which may have storage and/or processing capabilities. The processing circuitry 42 may include a processor 44 and memory 46. In particular, in addition to or instead of a processor, such as a central processing unit, and memory, the processing circuitry 42 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 44 may be configured to access (e.g., write to and/or read from) memory 46, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Processing circuitry 42 may be configured to control any of the methods and/or processes described herein and/or to cause such methods, and/or processes to be performed, e.g., by host computer 24. Processor 44 corresponds to one or more processors 44 for performing host computer 24 functions described herein. The host computer 24 includes memory 46 that is configured to store data, programmatic software code and/or other information described herein. In some embodiments, the software 48 and/or the host application 50 may include instructions that, when executed by the processor 44 and/or processing circuitry 42, causes the processor 44 and/or processing circuitry 42 to perform the processes described herein with respect to host computer 24. The instructions may be software associated with the host computer 24.

The software 48 may be executable by the processing circuitry 42. The software 48 includes a host application 50. The host application 50 may be operable to provide a service to a remote user, such as a WD 22 connecting via an OTT connection 52 terminating at the WD 22 and the host computer 24. In providing the service to the remote user, the host application 50 may provide user data which is transmitted using the OTT connection 52. The "user data" may be data and information described herein as implementing the described functionality. In one embodiment, the host computer 24 may be configured for providing control and functionality to a service provider and may be operated by the service provider or on behalf of the service provider. The processing circuitry 42 of the host computer 24 may enable the host computer 24 to observe, monitor, control, transmit to and/or receive from the network node 16 and or the wireless device 22. The processing circuitry 42 of the host computer 24 may include an information unit 54 configured to enable the service provider to transmit, receive, forward, relay, communicate, determine, process, etc. information related to beam selection and/or signaling.

The communication system 10 further includes a network node 16 provided in a communication system 10 and including hardware 58 enabling it to communicate with the host computer 24 and with the WD 22. The hardware 58 may include a communication interface 60 for setting up and maintaining a wired or wireless connection with an interface of a different communication device of the communication system 10, as well as a radio interface 62 for setting up and maintaining at least a wireless connection 64 with a WD 22 located in a coverage area 18 served by the network node 16. The radio interface 62 may be formed as or may include, for example, one or more RF transmitters, one or more RF receivers, and/or one or more RF transceivers. The communication interface 60 may be configured to facilitate a connection 66 to the host computer 24. The connection 66 may be direct or it may pass through a core network 14 of the communication system 10 and/or through one or more intermediate networks 30 outside the communication system 10.

In the embodiment shown, the hardware 58 of the network node 16 further includes processing circuitry 68. The processing circuitry 68 may include a processor 70 and a memory 72. In particular, in addition to or instead of a processor, such as a central processing unit, and memory, the processing circuitry 68 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 70 may be configured to access (e.g., write to and/or read from) the memory 72, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 74 stored internally in, for example, memory 72, or stored in external memory (e.g., database, storage array, network storage device, etc.) accessible by the network node 16 via an external connection. The software 74 may be executable by the processing circuitry 68. The processing circuitry 68 may be configured to control any of the methods and/or processes described herein and/or to cause such methods, and/or processes to be performed, e.g., by network node 16. Processor 70 corresponds to one or more processors 70 for performing network node 16 functions described herein. The memory 72 is configured to store data, programmatic software code and/or other information described herein. In some embodiments, the software 74 may include instructions that, when executed by the processor 70 and/or processing circuitry 68, causes the processor 70 and/or processing circuitry 68 to perform the processes described herein with respect to network node 16. For example, processing circuitry 68 of the network node 16 may include beam unit 32 configured to perform one or more function described herein such as determining a precoder for based on beam information, for example, as described herein.

The communication system 10 further includes the WD 22 already referred to. The WD 22 may have hardware 80 that may include a radio interface 82 configured to set up and maintain a wireless connection 64 with a network node 16 serving a coverage area 18 in which the WD 22 is currently located. The radio interface 82 may be formed as or may include, for example, one or more RF transmitters, one or more RF receivers, and/or one or more RF transceivers.

The hardware 80 of the WD 22 further includes processing circuitry 84. The processing circuitry 84 may include a processor 86 and memory 88. In particular, in addition to or instead of a processor, such as a central processing unit, and memory, the processing circuitry 84 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 86 may be configured to access (e.g., write to and/or read from) memory 88, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 90, which is stored in, for example, memory 88 at the WD 22, or stored in external memory (e.g., database, storage array, network storage device, etc.) accessible by the WD 22. The software 90 may be executable by the processing circuitry 84. The software 90 may include a client application 92. The client application 92 may be operable to provide a service to a human or non-human user via the WD 22, with the support of the host computer 24. In the host computer 24, an executing host application 50 may communicate with the executing client application 92 via the OTT connection 52 terminating at the WD 22 and the host computer 24. In providing the service to the user, the client application 92 may receive request data from the host application 50 and provide user data in response to the request data. The OTT connection 52 may transfer both the request data and the user data. The client application 92 may interact with the user to generate the user data that it provides.

The processing circuitry 84 may be configured to control any of the methods and/or processes described herein and/or to cause such methods, and/or processes to be performed, e.g., by WD 22. The processor 86 corresponds to one or more processors 86 for performing WD 22 functions described herein. The WD 22 includes memory 88 that is configured to store data, programmatic software code and/or other information described herein. In some embodiments, the software 90 and/or the client application 92 may include instructions that, when executed by the processor 86 and/or processing circuitry 84, causes the processor 86 and/or processing circuitry 84 to perform the processes described herein with respect to WD 22. For example, the processing circuitry 84 of the wireless device 22 may include a selection unit 34 configured to perform one or more functions described herein such as those functions related to performing beam selection based at least in part on beam information received via device-to-device communication.

Figure 2:
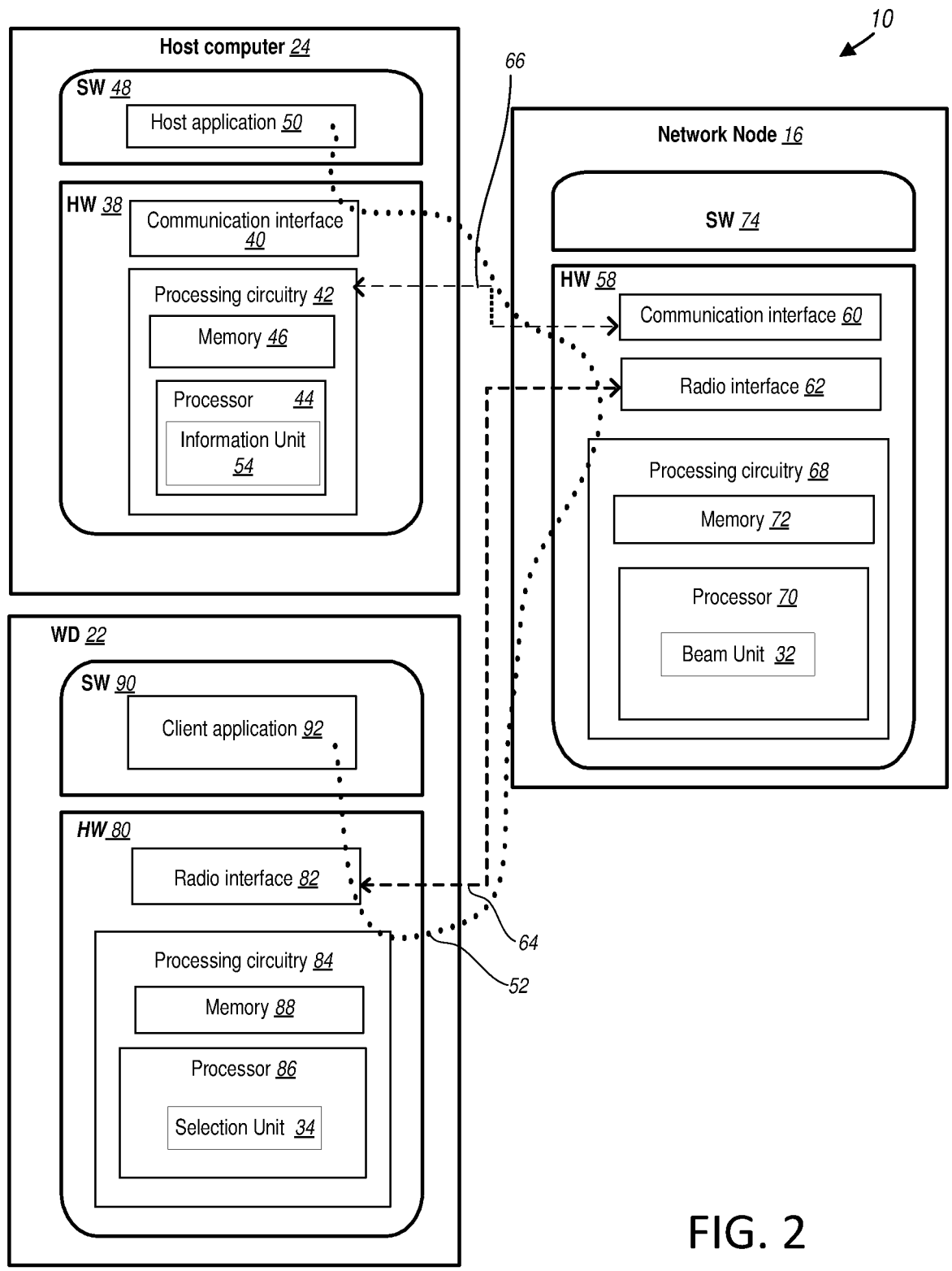
FIG. 2 is a block diagram of a host computer communicating via a network node with a wireless device over an at least partially wireless connection according to some embodiments of the present disclosure.

In some embodiments, the inner workings of the network node 16, WD 22, and host computer 24 may be as shown in FIG. 2 and independently, the surrounding network topology may be that of FIG. 1.

In FIG. 2, the OTT connection 52 has been drawn abstractly to illustrate the communication between the host computer 24 and the wireless device 22 via the network node 16, without explicit reference to any intermediary devices and the precise routing of messages via these devices. Network infrastructure may determine the routing, which it may be configured to hide from the WD 22 or from the service provider operating the host computer 24, or both. While the OTT connection 52 is active, the network infrastructure may further take decisions by which it dynamically changes the routing (e.g., on the basis of load balancing consideration or reconfiguration of the network).

The wireless connection 64 between the WD 22 and the network node 16 is in accordance with the teachings of the embodiments described throughout this disclosure. One or more of the various embodiments improve the performance of OTT services provided to the WD 22 using the OTT connection 52, in which the wireless connection 64 may form the last segment. More precisely, the teachings of some of these embodiments may improve the data rate, latency, and/or power consumption and thereby provide benefits such as reduced user waiting time, relaxed restriction on file size, better responsiveness, extended battery lifetime, etc.

In some embodiments, a measurement procedure may be provided for the purpose of monitoring data rate, latency and other factors on which the one or more embodiments improve. There may further be an optional network functionality for reconfiguring the OTT connection 52 between the host computer 24 and WD 22, in response to variations in the measurement results. The measurement procedure and/or the network functionality for reconfiguring the OTT connection 52 may be implemented in the software 48 of the host computer 24 or in the software 90 of the WD 22, or both. In embodiments, sensors (not shown) may be deployed in or in association with communication devices through which the OTT connection 52 passes; the sensors may participate in the measurement procedure by supplying values of the monitored quantities exemplified above, or supplying values of other physical quantities from which software 48, 90 may compute or estimate the monitored quantities. The reconfiguring of the OTT connection 52 may include message format, retransmission settings, preferred routing etc.; the reconfiguring need not affect the network node 16, and it may be unknown or imperceptible to the network node 16. Some such procedures and functionalities may be known and practiced in the art. In certain embodiments, measurements may involve proprietary WD signaling facilitating the host computer's 24 measurements of throughput, propagation times, latency and the like. In some embodiments, the measurements may be implemented in that the software 48, 90 causes messages to be transmitted, in particular empty or 'dummy' messages, using the OTT connection 52 while it monitors propagation times, errors etc.

Thus, in some embodiments, the host computer 24 includes processing circuitry 42 configured to provide user data and a communication interface 40 that is configured to forward the user data to a cellular network for transmission to the WD 22. In some embodiments, the cellular network also includes the network node 16 with a radio interface 62. In some embodiments, the network node 16 is configured to, and/or the network node's 16 processing circuitry 68 is configured to perform the functions and/or methods described herein for preparing/initiating/maintaining/supporting/ending a transmission to the WD 22, and/or preparing/terminating/maintaining/supporting/ending in receipt of a transmission from the WD 22.

In some embodiments, the host computer 24 includes processing circuitry 42 and a communication interface 40 that is configured to a communication interface 40 configured to receive user data originating from a transmission from a WD 22 to a network node 16. In some embodiments, the WD 22 is configured to, and/or comprises a radio interface 82 and/or processing circuitry 84 configured to perform the functions and/or methods described herein for preparing/initiating/maintaining/supporting/ending a transmission to the network node 16, and/or preparing/terminating/maintaining/supporting/ending in receipt of a transmission from the network node 16.

Although FIGS. 1 and 2 show various "units" such as beam unit 32, and selection unit 34 as being within a respective processor, it is contemplated that these units may be implemented such that a portion of the unit is stored in a corresponding memory within the processing circuitry. In other words, the units may be implemented in hardware or in a combination of hardware and software within the processing circuitry.

FIG. 3 is a flowchart illustrating an exemplary method implemented in a communication system, such as, for example, the communication system of FIGS. 1 and 2, in accordance with one embodiment. The communication system may include a host computer 24, a network node 16 and a WD 22, which may be those described with reference to FIG. 2. In a first step of the method, the host computer 24 provides user data (Block S100). In an optional substep of the first step, the host computer 24 provides the user data by executing a host application, such as, for example, the host application 50 (Block S102). In a second step, the host computer 24 initiates a transmission carrying the user data to the WD 22 (Block S104). In an optional third step, the network node 16 transmits to the WD 22 the user data which was carried in the transmission that the host computer 24 initiated, in accordance with the teachings of the embodiments described throughout this disclosure (Block S106). In an optional fourth step, the WD 22 executes a client application, such as, for example, the client application 92, associated with the host application 50 executed by the host computer 24 (Block S108).

FIG. 4 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In a first step of the method, the host computer 24 provides user data (Block S110). In an optional substep (not shown) the host computer 24 provides the user data by executing a host application, such as, for example, the host application 50. In a second step, the host computer 24 initiates a transmission carrying the user data to the WD 22 (Block S112). The transmission may pass via the network node 16, in accordance with the teachings of the embodiments described throughout this disclosure. In an optional third step, the WD 22 receives the user data carried in the transmission (Block S114).

FIG. 5 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, the WD 22 receives input data provided by the host computer 24 (Block S116). In an optional substep of the first step, the WD 22 executes the client application 92, which provides the user data in reaction to the received input data provided by the host computer 24 (Block S118). Additionally or alternatively, in an optional second step, the WD 22 provides user data (Block S120). In an optional substep of the second step, the WD provides the user data by executing a client application, such as, for example, client application 92 (Block S122). In providing the user data, the executed client application 92 may further consider user input received from the user. Regardless of the specific manner in which the user data was provided, the WD 22 may initiate, in an optional third substep, transmission of the user data to the host computer 24 (Block S124). In a fourth step of the method, the host computer 24 receives the user data transmitted from the WD 22, in accordance with the teachings of the embodiments described throughout this disclosure (Block S126).

FIG. 6 is a flowchart illustrating an exemplary method implemented in a communication system, such as, for example, the communication system of FIG. 1, in accordance with one embodiment. The communication system may include a host computer 24, a network node 16 and a WD 22, which may be those described with reference to FIGS. 1 and 2. In an optional first step of the method, in accordance with the teachings of the embodiments described throughout this disclosure, the network node 16 receives user data from the WD 22 (Block S128). In an optional second step, the network node 16 initiates transmission of the received user data to the host computer 24 (Block S130). In a third step, the host computer 24 receives the user data carried in the transmission initiated by the network node 16 (Block S132).

Figure 7:
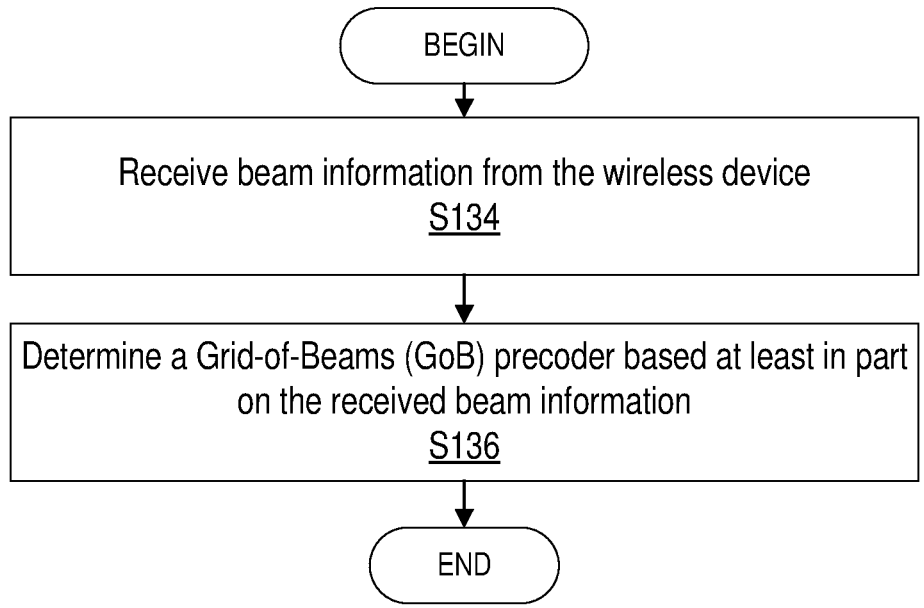
FIG. 7 is a flowchart of an exemplary process in a network node according to some embodiments of the present disclosure.

FIG. 7 is a flowchart of an exemplary process in a network node 16 in accordance with one or more embodiments. One or more Blocks and/or functions performed by network node 16 may be performed by one or more elements of network node 16 such as by beam unit 32 in processing circuitry 68, processor 70, radio interface 62, etc. In one or more embodiments, network node 16 such as via one or more of processing circuitry 68, processor 70, communication interface 60 and radio interface 62 is configured to receive (Block S134) beam information from the wireless device, as described herein. In one or more embodiments, network node 16 such as via one or more of processing circuitry 68, processor 70, communication interface 60 and radio interface 62 is configured to determine (Block S135) a Grid-of-Beams (GoB) precoder based at least in part on the received beam information. In one or more embodiments, the precoded references are transmitted via radio interface 62 to wireless device 22.

According to one or more embodiments, during a coherence time, alternate between a training phase and a data communication phase. The training phase includes transmitting precoded training sequences and receiving reports of an estimated effective channel based at least in part on the precoded training sequences, and the data communication phase includes transmitting data symbols associated with a data precoder based at least in part on the reported estimated effective channel. According to one or more embodiments, the network node 16 is configured to operate in a frequency division duplex (FDD) massive Multiple-Input and Multiple-Output (mMIMO) configuration, and the beam information includes a precoding matrix index (PMI).

Figure 8:
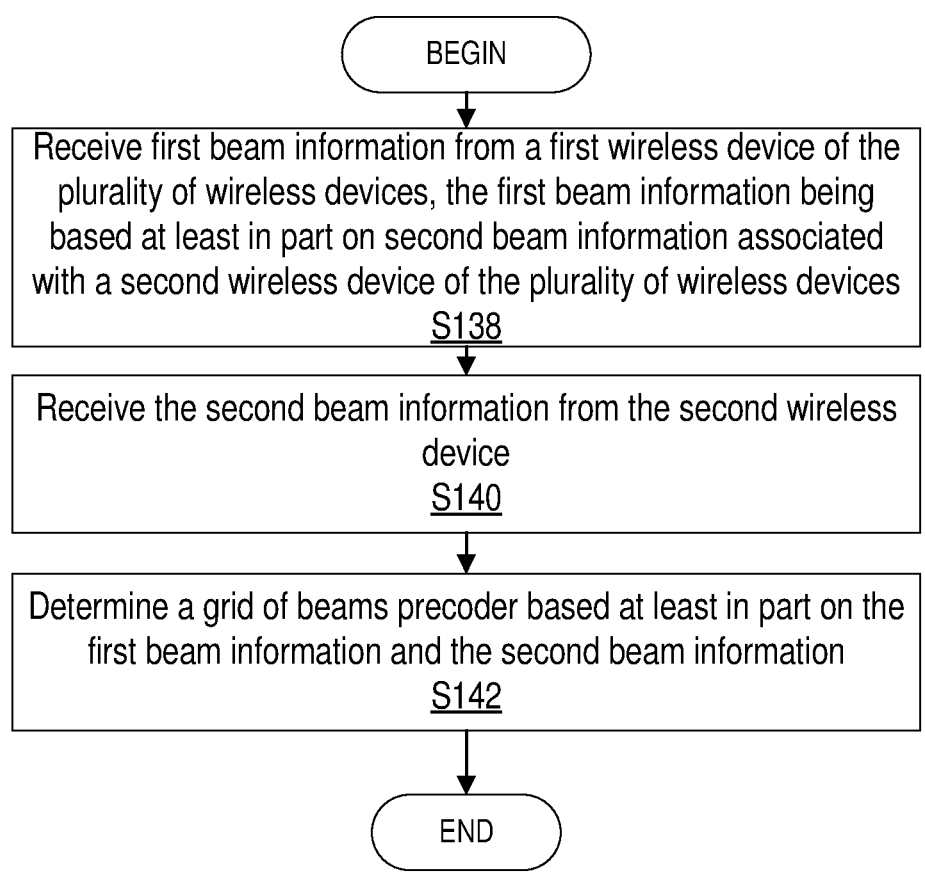
FIG. 8 is a flowchart of another exemplary process in a network node according to some embodiments of the present disclosure.

FIG. 8 is a flowchart of another exemplary process in a network node 16 in accordance with one or more embodiments. One or more Blocks and/or functions performed by network node 16 may be performed by one or more elements of network node 16 such as by beam unit 32 in processing circuitry 68, processor 70, radio interface 62, etc. In one or more embodiments, network node 16 such as via one or more of processing circuitry 68, processor 70, communication interface 60 and radio interface 62 is configured to receive (Block S138) first beam information from a first wireless device 22 of the plurality of wireless devices 22 where the first beam information is based at least in part on second beam information associated with a second wireless device 22 of the plurality of wireless devices 22, as described herein. In one or more embodiments, network node 16 such as via one or more of processing circuitry 68, processor 70, communication interface 60 and radio interface 62 is configured to receive (Block S140) the second beam information from the second wireless device 22, as described herein. In one or more embodiments, network node 16 such as via one or more of processing circuitry 68, processor 70, communication interface 60 and radio interface 62 is configured to determine (Block S142) a grid of beams precoder based at least in part on the first beam information and the second beam information, as described herein.

According to one or more embodiments, the first beam information and second beam information corresponds to respective pre-coding matrix indicators. According to one or more embodiments, the first beam information includes at least one of an effective covariance, a rank indication and index of beam codebook. According to one or more embodiments, the first beam information is based at least in part on a selection criteria includes at least one of: a minimum channel gain associated with a beam, avoidance of multi-user interference compared to at least one other beam, maximize signal-to-interference noise ratio compared to at least one other beam, and a reduced in beam training overhead compared to at least one other beam According to one or more embodiments, the processing circuitry 68 is further configured to: cause transmission of at least one precoded training sequence that is based at least in part on the grid of beams precoder, receive an estimate of an effective channel between the first wireless device 22 and the network node 16 that is based at least in part on the at least one precoded training sequence, receive a report of the estimated effective channel, and determine a Multiple-Input Multiple-Output, MIMO, data precoder determination based at least in part on the report of the estimated effective channel. According to one or more embodiments, the transmission of the precoded training sequence and the receiving of reporting of the estimated effective channel occur during a predefined channel coherence time period. According to one or more embodiments, the first beam information is based at least in part on third beam information associated with a third wireless device 22 where the third beam information indicates at least one beam selected by the third wireless device 22 for wireless communications. According to one or more embodiments, the processing circuitry 68 is further configured to receive the third beam information from the third wireless device 22, and where the gird of beams precoder is based at least in part on the third beam information.

Figure 9:
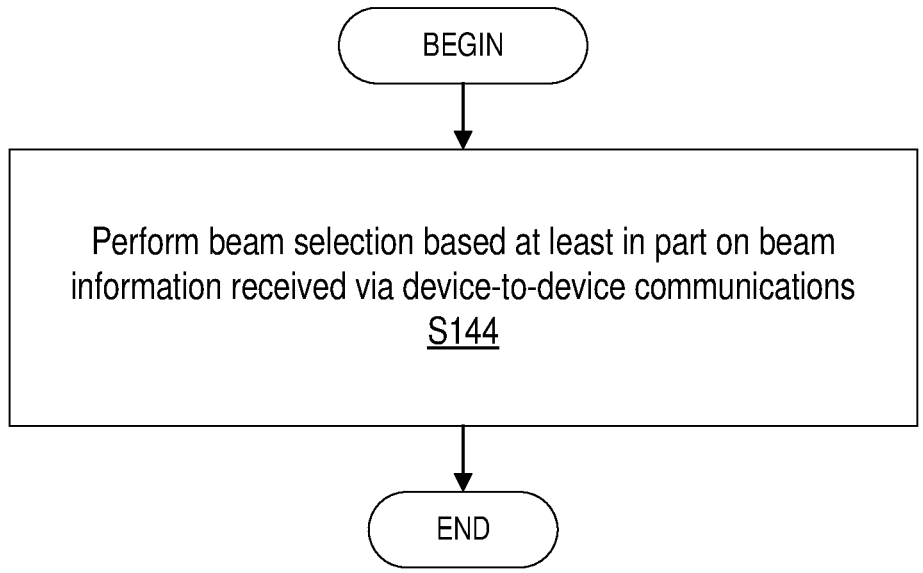
FIG. 9 is a flowchart of an exemplary process in a wireless device according to some embodiments of the present disclosure.

FIG. 9 is a flowchart of an exemplary process in a wireless device 22 according to some embodiments of the present disclosure. One or more Blocks and/or functions performed by wireless device 22 may be performed by one or more elements of wireless device 22 such as by selection unit 34 in processing circuitry 84, processor 86, radio interface 82, etc. In one or more embodiments, wireless device such as via one or more of processing circuitry 84, processor 86, selection unit 34 and radio interface 82 is configured to perform (Block S144) beam selection based at least in part on beam information received via device-to-device (D2D) communications, as described herein.

According to one or more embodiments, the radio interface 82 and/or processing circuitry 84 is further configured to communicate the beam selection to the network node 16, and receive a precoded reference signal that is based on the communicated beam selection. According to one or more embodiments, the radio interface 82 and/or processing circuitry 84 is further configured to, during a coherence time, alternate between training phase and data communication phase. The training phase includes receiving precoded training sequences and reporting an estimated effective channel based at least in part on the precoded training sequences, and the data communication phase includes receiving data symbols associated with a data precoder based at least in part on the reported estimated effective channel.

Figure 10:
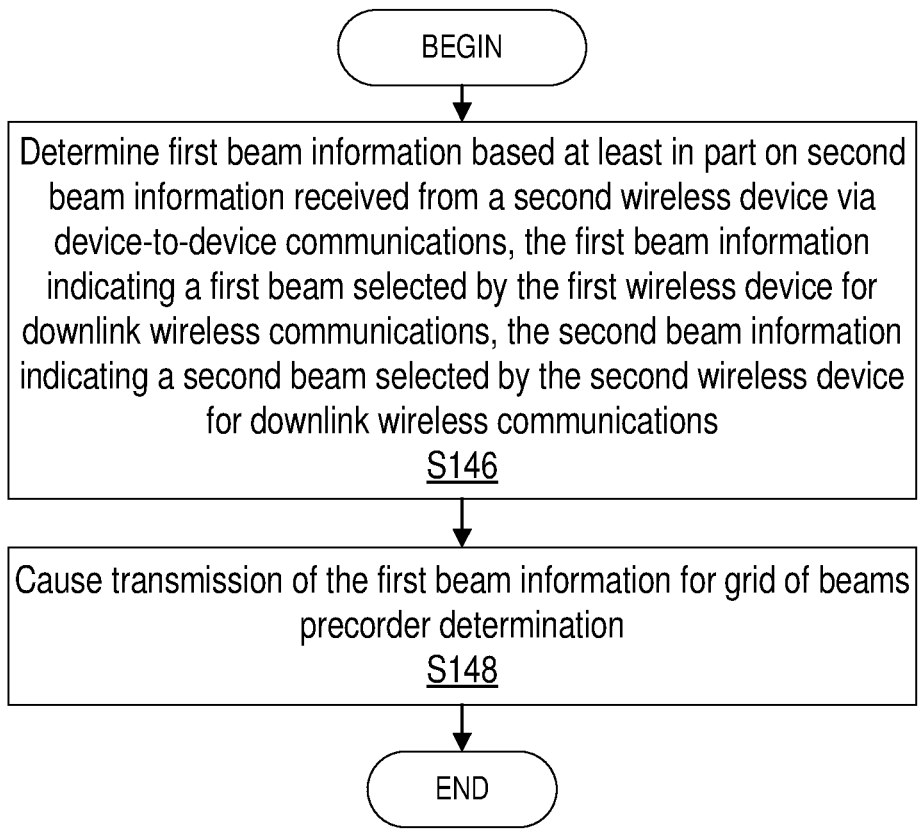
FIG. 10 is a flowchart of another exemplary process in a network node according to some embodiments of the present disclosure.

FIG. 10 is a flowchart of another exemplary process in a wireless device 22 according to some embodiments of the present disclosure. One or more Blocks and/or functions performed by wireless device 22 may be performed by one or more elements of wireless device 22 such as by selection unit 34 in processing circuitry 84, processor 86, radio interface 82, etc. In one or more embodiments, wireless device such as via one or more of processing circuitry 84, processor 86, selection unit 34 and radio interface 82 is configured to determine (Block S146) first beam information based at least in part on second beam information received from a second wireless device 22 via device-to-device communications where the first beam information indicates a first beam selected by the first wireless device 22 for downlink wireless communications, and where the second beam information indicates a second beam selected by the second wireless device 22 for downlink wireless communications, as described herein. In one or more embodiments, wireless device 22 such as via one or more of processing circuitry 84, processor 86, selection unit 34 and radio interface 82 is configured to cause (Block S148) transmission of the first beam information for grid of beams precoder determination, as described herein.

According to one or more embodiments, the first beam information and second beam information corresponds to respective precoding matrix indicators. According to one or more embodiments, the first beam information includes at least one of an effective covariance, a rank indication and index of beam codebook. According to one or more embodiments, the determination of the first beam information is based at least in part on a selection criteria that includes at least one of: a minimum channel gain associated with a beam, avoidance of multi-user interference compared to at least one other beam, maximize signal-to-interference noise ratio compared to at least one other beam, and a reduced in beam training overhead compared to at least one other beam.

According to one or more embodiments, the processing circuitry 84 is further configured to: receive at least one precoded training sequence that is based at least in part on the grid of beams precoder where the grid of beams precoder is based at in part on the first beam information and second beam information, estimate an effective channel between the first wireless device 22 and a network node 16 based at least in part on the received at least one precoded training sequence, and report the estimated effective channel to the network node for Multiple-Input Multiple-Output, MIMO, data precoder determination. According to one or more embodiments, the receiving of the precoded training sequence and the reporting of the estimated effective channel are performed during a predefined channel coherence time period. According to one or more embodiments, the first beam information is determined during a predefined beam coherence time period different from the predefined channel coherence time period. According to one or more embodiments, the determination of the first beam information is based at least in part on third beam information received from a third wireless device 22 via device-to-device communications where the third beam information indicates at least one beam selected by the third wireless device 22 for wireless communications.

Having generally described arrangements for beam selection and signaling, details for these arrangements, functions and processes are provided as follows, and which may be implemented by the network node 16, wireless device 22 and/or host computer 24.

Embodiments provide beam selection and signaling in accordance with the principles of the disclosure as described herein.

The following scenario is be used to describe at least some of the teachings of the disclosure. Nevertheless, this scenario does not limit the general scope of the disclosure.

Figure 11:
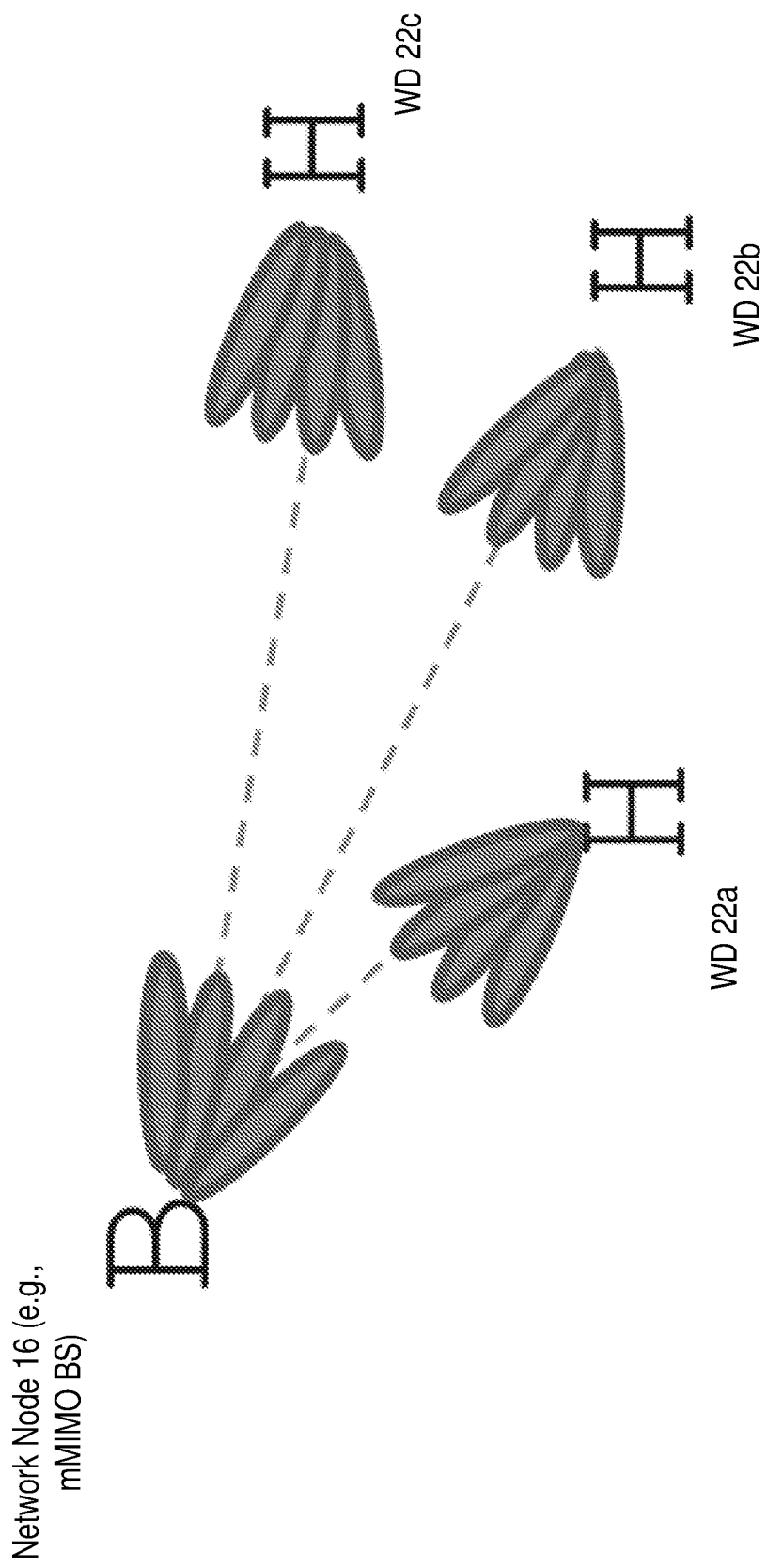
FIG. 11 is a diagram of an example scenario with mMIMO network node serving three multi-antenna wireless devices where both the network node and wireless devices are configured with gird-of-beams.

In the scenario illustrated in FIG. 11, a network node 16 such as a mMIMO network node is serving a number of wireless devices 22 (WD 22a, WD 22b and WD 22c) simultaneously over the same time-frequency slots. Both the network node 16 and the WDs 22 make use of a grid-of-beams (GoBs). As part of the typical channel estimation process in FDD systems, the network node 16 transmits, such as via radio interface 62, precoded reference signals to the wireless devices 22 on a channel coherence time basis. The channel seen at the k-th WD 22 is thus an effective channel resulting from the concatenation of the GoB precoder, the radio channel between the network node 16 and the k-th WD 22, and the GoB combiner at the k-th WD 22. For simplification, the GoB combiner, implemented by processing circuitry 84 for example, at each WD 22 is composed by a single activated beam only (among the ones in the grid).

Based on the reception of the reference signals from network node 16, each wireless device 22 is able to estimate via processing circuitry 84 and/or selection unit 34 its effective channel (through, e.g., Least-Square or MMSE methods) and feed the estimation back to the network node 16 for subsequent MIMO (data) precoder design/determination by the network node 16. At least one of the functions of the precoder may be to spatially separate the communication streams relative to each wireless device 22.

Figure 12:
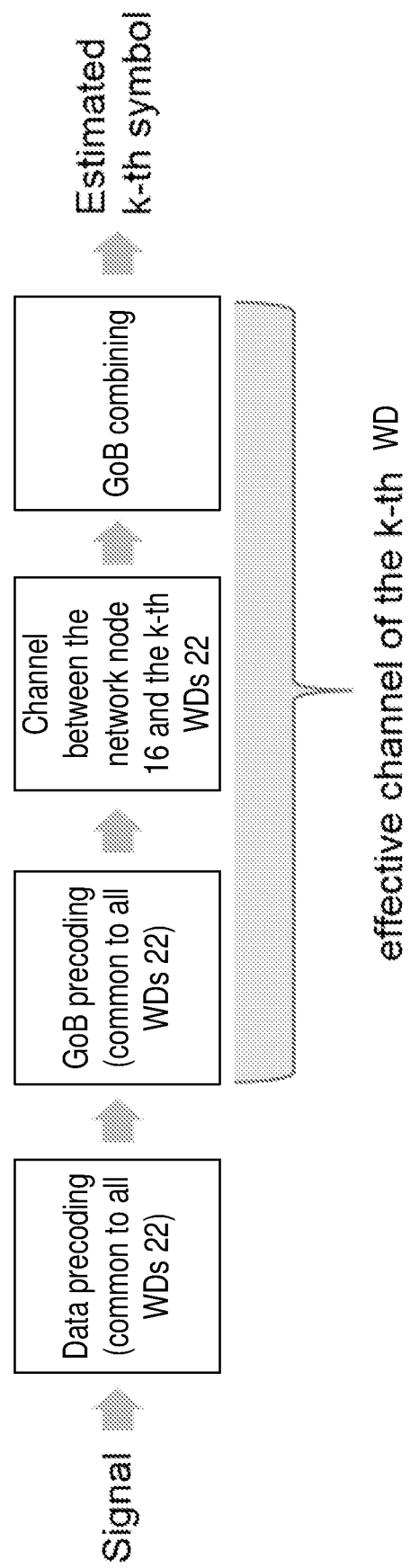
FIG. 12 is a diagram of a communication chain relative to the k-th wireless device.

The data transmission phase starts after the network node 16 has received the estimated effective channels from all the wireless devices 22. The data signal containing the symbols to be transmitted simultaneously to all the wireless devices 22 may first go through the data precoder (i.e., implemented by processing circuitry 68 and/or beam unit 32 for example) and then through the effective channel. Both the data precoder and the GoB precoder may be common to all the wireless devices 22. The overall communication chain relative to the generic k-th WD 22 is illustrated in FIG. 12.

System Performance and Beam/Precoder Selection

In the scenario of FIG. 11, the rate at the k-th WD 22 depends on a pre-log factor proportional to the training overhead and a log one depending on the SINR. The training overhead may be equal to the cardinality of the set union of the reported PMIs, as the latter composes the GoB precoding matrix. In one or more embodiments, to minimize the overhead, the WDs 22 may align on the same beams by exploiting the beamforming capabilities at the WD 22 side. Yet, this option may be less practical due to the potential poor beamforming gain and strong multi-user interference that may be experienced by the WDs 22. In general, there is a need to strike a balance between training overhead and signal-to-interference-and-noise ratio (SINR).

The system performance may depend on the beams activated at each WD 22. That is because each beam excites a different channel subspace and thus highlights different relevant channel components, which may be used in determining the training overhead and the SNR. The best combination of beams (among the ones in the grid) may be those that maximize the average sum-rate. In particular, the rate at the k-th WD 22 (in its pre-log and log components) jointly depends on all the GoB combiners. In other words, the combining decisions at the WDs 22 affect each other. Therefore, a central coordinator with "perfect" knowledge of the global instantaneous CSI may be required for optimal beam selection across the WDs 22. However, such knowledge may come at the expense of unfeasible resource overhead in the mMIMO regime.

Hierarchical Beam/Precoder Selection

To address at least in part the problem described above, the WDs 22, according to one or more embodiments, perform via processing circuitry 84 and/or selection unit 34 a hierarchical (or greedy) beam selection algorithm facilitated by D2D communications. In this case, no central coordinator may be used as each wireless device 22 performs its beam decision/selection knowing that some other beams have already been chosen and fixed. The resulting beam decision may be sub-optimal, in one or more embodiments, but allows for an algorithm derivation as described herein.

Figure 13:
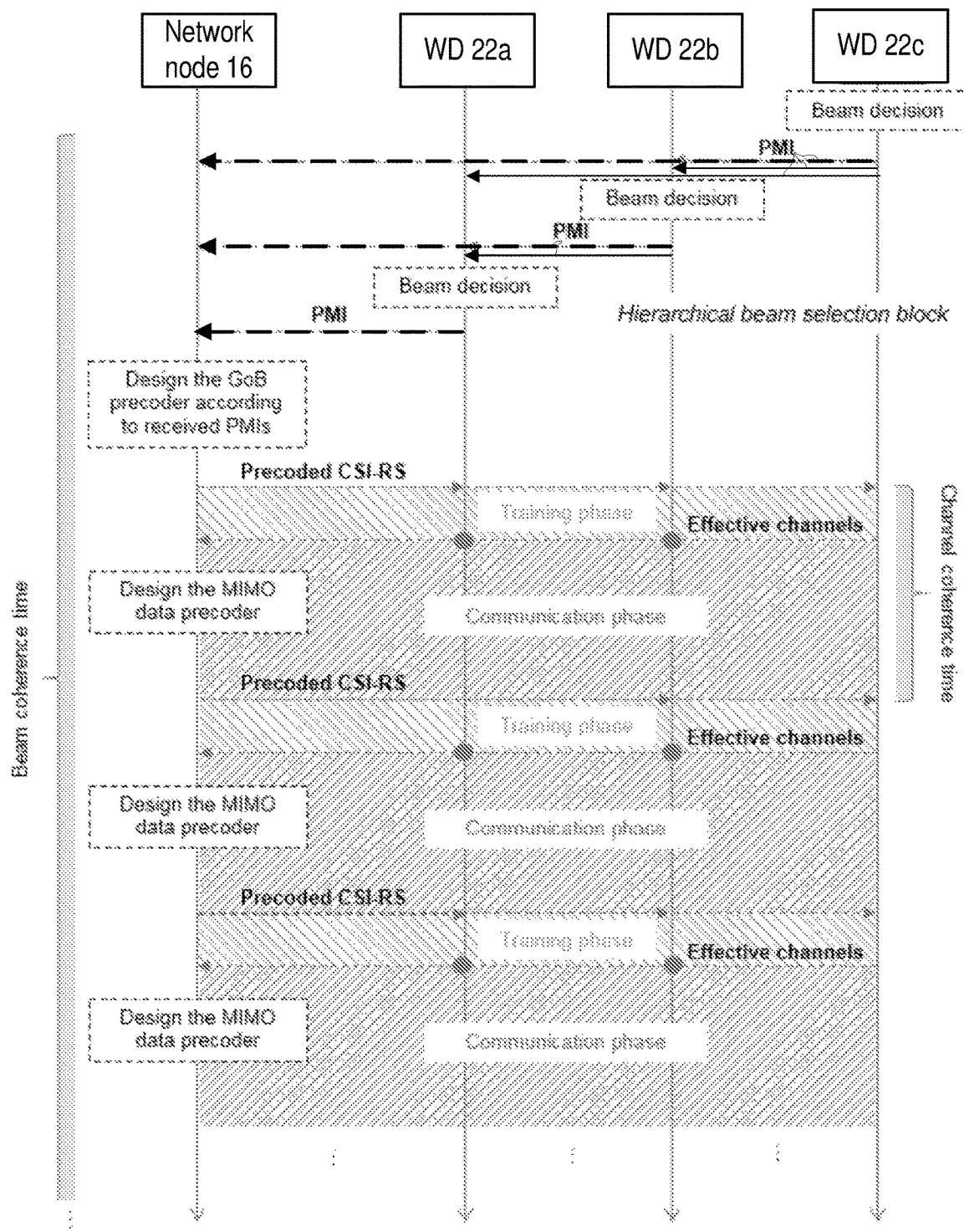
FIG. 13 is a signaling diagram of an example scenario of FIG. 11.

FIG. 13 below shows an overview of the method and the messages/signaling that the network node 16 and the WDs 22 exchange according one or more embodiments. The detailed step-by-step procedure is as follows:

On a beam coherence time basis (i.e., during a predefined beam coherence time period), the WDs 22 perform, via processing circuitry 84 and/or selection unit 34, hierarchical beam selection, according to one or more embodiments, as described below. Since the beam coherence time is proportional to how fast the second order statistics change, the overhead incurred by this operation may be negligible. In one or more embodiments, the predefined beam coherence time is 500 ms. Hierarchical beam selection involves one or more of the following steps:

The WD 22c (the highest-ranked WD 22) performs via processing circuitry 84 and/or selection unit 34 its beam selection by maximizing its local SNR. For example, in one or more embodiments, WD 22c may perform the beam selection without receiving and/or not based on PMI or similar beam information from one or more other WDs 22 such as WDs 22a and 22b. WD 22c then sends via radio interface 82 the PMI, i.e., beam information, related to the beam selection decision to the lower-ranked WDs 22 (WD 22b and WD 22a in this case) through D2D side-links and to the network node 16 through standard control channels.

The WD 22b, via processing circuitry 84 and/or selection unit 34, performs its beam selection by optimizing a given and/or predefined objective function (described below in the beam/precoder selection algorithm section) based at least in part on the PMI received from the higher-ranked WD 22c, i.e., WD 22b's beam decision is based at least in part on the PMI received from WD 22c. WD 22b then sends, via radio interface 82, its PMI to the network node 16 (through control channels) and to the WD 22a (via D2D communications).

The WD 22a performs via processing circuitry 84 and/or selection unit 34 its beam selection by optimizing a given objective function (described below in the beam/precoder selection algorithm section) based at least in part on the PMIs received from WD 22b and WD 22a.

WD 22a then sends via radio interface 82 its PMI to the network node 16 through control channels.

Once the network node 16 has received via the radio interface 62 all the PMIs, i.e., optimized PMIs for example, the network node 16 via processing circuitry 68 and/or beam unit 32 designs/determines the GoB precoder. In one or more embodiments, the GoB precoder is composed/designed/determined based at least in part on all the beamforming vectors relative to the set union of the reported PMIs, i.e., PMIs reported by WD 22a -c in this example. While the examples described herein relate to the exchange of PMIs, in one or more embodiments, other beam information may be exchanged with or instead of PMI such that the beam selection at the WD 22 is based on at least in part on this beam information. For example, in one or more embodiments, the beam information may include one or more of PMI, an effective covariance, rank indication (RI) and index of beam codebook.

On a channel coherence time basis (i.e., during a pre-defined channel coherence time period where the channel is assumed to be static), the training phase and data communication phase may alternate. In one or more embodiments, the predefined channel coherence time may be 100 ms. This operation may be repeated until the beam coherence time expires, for example. In particular:

Training phase: the network node 16 sends via radio interface 62 precoded training sequences to all the wireless devices 22 simultaneously where each wireless device 22 estimates its own effective channel (complex channel coefficients) and feeds the estimation back to the network node 16 through control channels. In one or more embodiments, the precoded training sequences are based at least in part on the GoB precoder. In one or more embodiments, each beam associated with the GoB precoder is trained in the training phase.

Data communication phase: the network node 16 designs/determines via processing circuitry 68 and/or beam unit 32 the MIMO data precoder by using the received estimated effective channels from the one or more wireless devices 22 and applies it to the data symbols before sending them over the effective channel.

In other words, in one or more embodiments, the training phase is advantageously started using a GoB precoder that is composed/designed/determined as described above, which may help, for example, reduce training overhead and/or provide other advantages due at least in part to the better and/or more accurate starting point provided by the GoB precoder when compared to the less accurate starting point provided in other training methods.

Beam/Precoder Selection Algorithm

In one or more embodiments, the beam decision/selection is performed at each WD 22 such that a given and/or predefined objective function is maximized. For example, maximum a function may result in maximizing or minimized a factor or characteristics. In this respect, one or more of the following algorithms may be implemented:

Uncoordinated algorithm (existing wireless communication standard): no PMI exchange is defined across the wireless devices 22 and the beam decision at the k-th WD 22 based on local average SNR of the k-th WD 22, i.e., WD 22 does not based its beam selection on PMI from other WDs as WD 22 does not receive such PMI.

Coordinated (overhead minimization) algorithm (i.e., improvement over the existing standard): the PMIs are exchanged in hierarchical fashion as in FIG. 13 and the beam decision at the k-th WD 22 aims at minimizing the pre-log factor due to training overhead. In particular, FIG. 13 illustrates a signaling sequence diagram in which the beam decision is made/performed at each wireless device 22 so that the system performance may be optimized. The decision performed by the wireless device 22 may be supported by some exchanged beam information, i.e., PMI, coming from higher ranked wireless devices in a hierarchical fashion.

Coordinated (rate maximization) algorithm, i.e., improvement over the existing standard: the PMIs are exchanged in hierarchical fashion as in FIG. 13 and the beam decision at the k-th WD 22 aim at jointly maximizing the pre-log factor due to training overhead and the log one including the SINR.

In one or more embodiments, the optimization function performed at the WD 22 may determine beam information (i.e., select a beam) based at least in part on a selection criteria including at least one of a minimum channel gain associated with a beam, avoidance of multi-user interference compared to at least one other beam, maximize signal-to-interference noise ratio compared to at least one other beam, and a reduced in beam training overhead compared to at least one other beam.

The above described algorithms have been compared using realistic simulations where various results are described below.

Simulations

Figure 14:
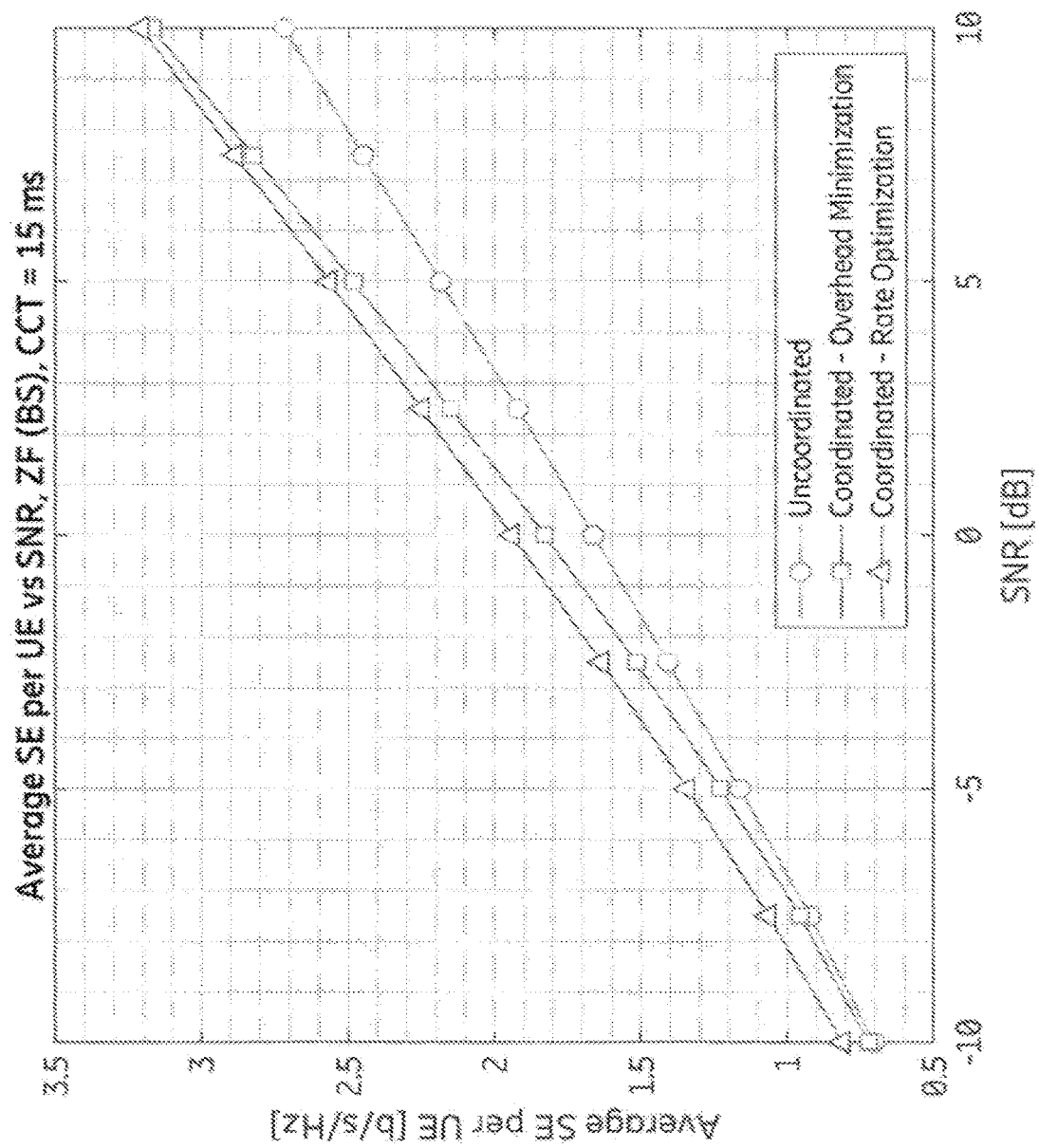
FIG. 14 is a graph comparing various algorithms.
Figure 15:
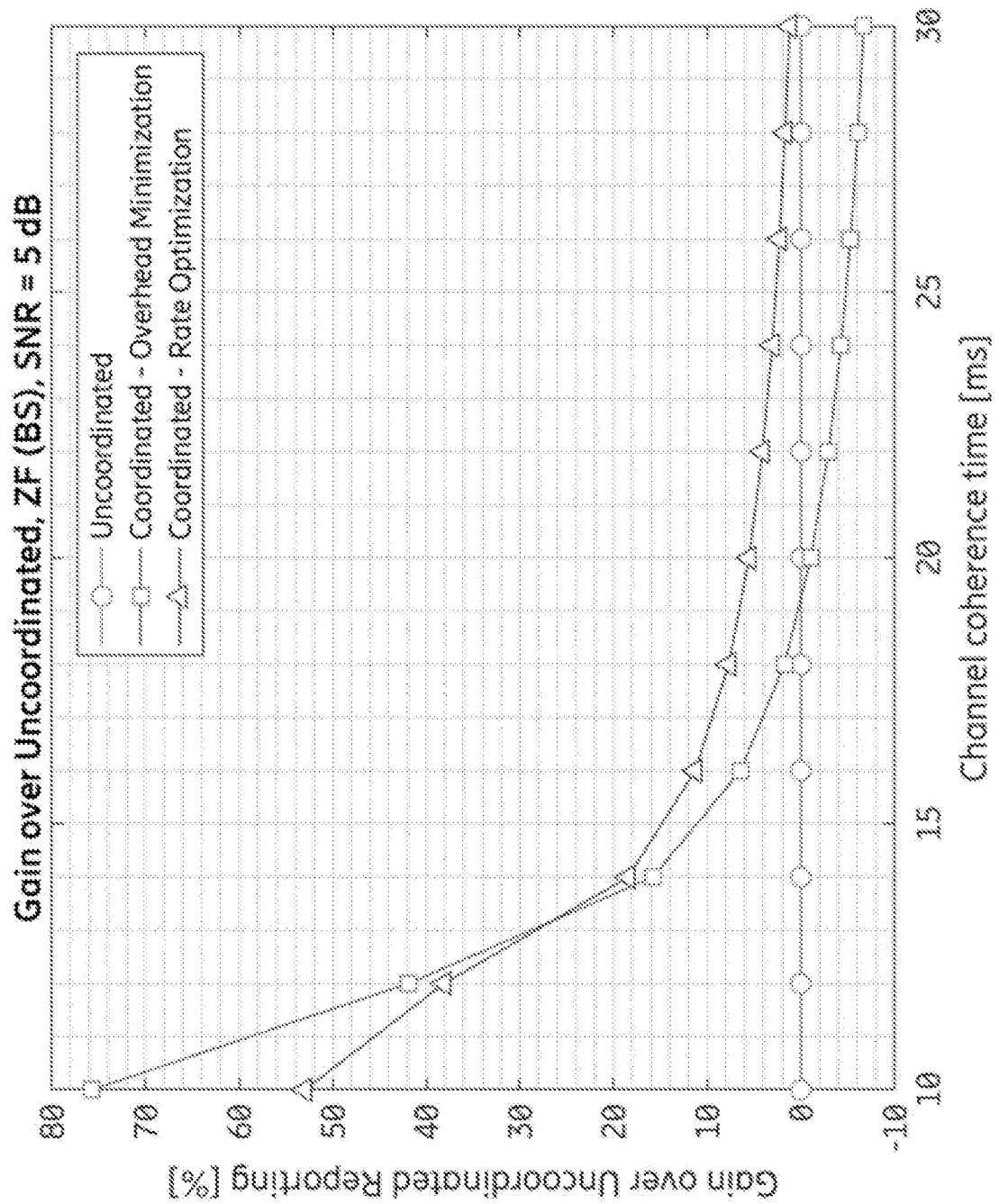
FIG. 15 another graph comparing various algorithms.

Plots/graphs such as those in FIGS. 14-15 have been generated under the following realistic scenarios and parameters:

mMIMO network node 16 with 64 antennas (32 beams in the grid)
WDs 22 with 8 antennas (4 beams in the grid)
3GPP Spatial Channel Model (micro-cell environment)
7 WDs 22 served simultaneously in Multi-User MIMO fashion through ZF precoder at the network node 16

Spectral Efficiency per WD 22 vs SNR

FIG. 14 illustrates average spectral efficient (SE) per WD 22 versus SNR where the coordinated algorithms described herein output perform the uncoordinated algorithm (existing standard) by reaching the same spectral efficiency with (up to) 5 dBs less. FIG. 14 is for channel coherence time of 15 ms (vehicular or fast pedestrian channel).

Gain Over Uncoordinated vs Channel Coherence Time

FIG. 15 illustrates gain over the uncoordinated reporting. In particular, coordinated beam selection may be required for short channel coherence times (<20 ms) with up to 75% gains in terms of spectral efficiency compared to the uncoordinated algorithm (existing standard). For longer channel coherence times (>20 ms), the training overhead becomes negligible and a reduction in gain is seen for the coordinated algorithms described herein. The coordinated algorithm which aims at minimizing the training overhead falls below the level of the uncoordinated algorithm at around a 20 ms channel coherence time. This is due to the fact that poor beamforming gains are obtained if the WDs 22 naively prefer beams which reduce training overhead but do not excite paths bearing sufficient power. Still, the coordinated algorithm (rate optimization) which takes the log factor (including the beamforming gain) into account still outperforms the uncoordinated solution throughout the channel coherence time as illustrated in FIG. 15.

Figure 16:
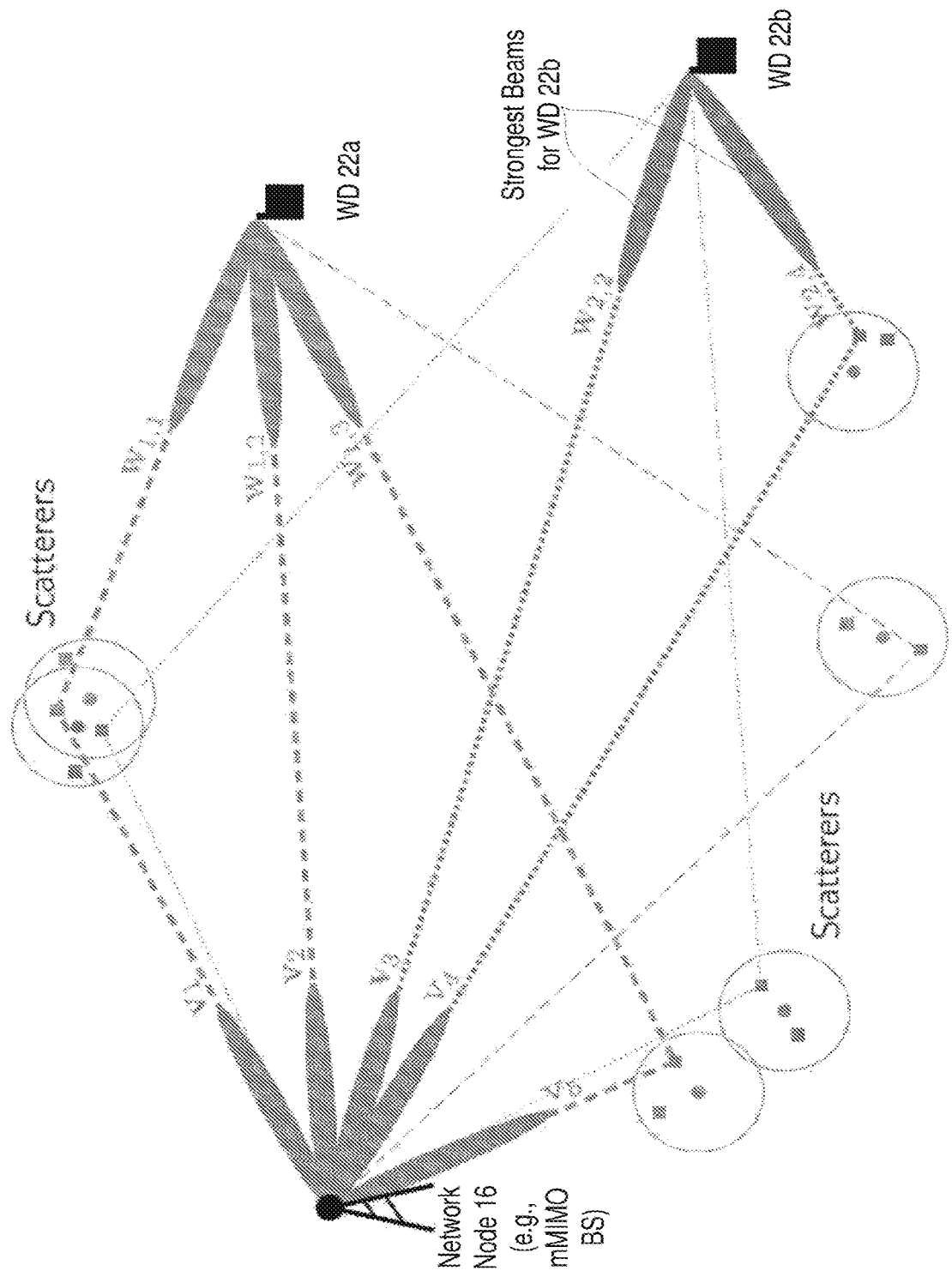
FIG. 16 is a diagram of an example of beam selection according to some embodiments of the present disclosure.
Figure 17:
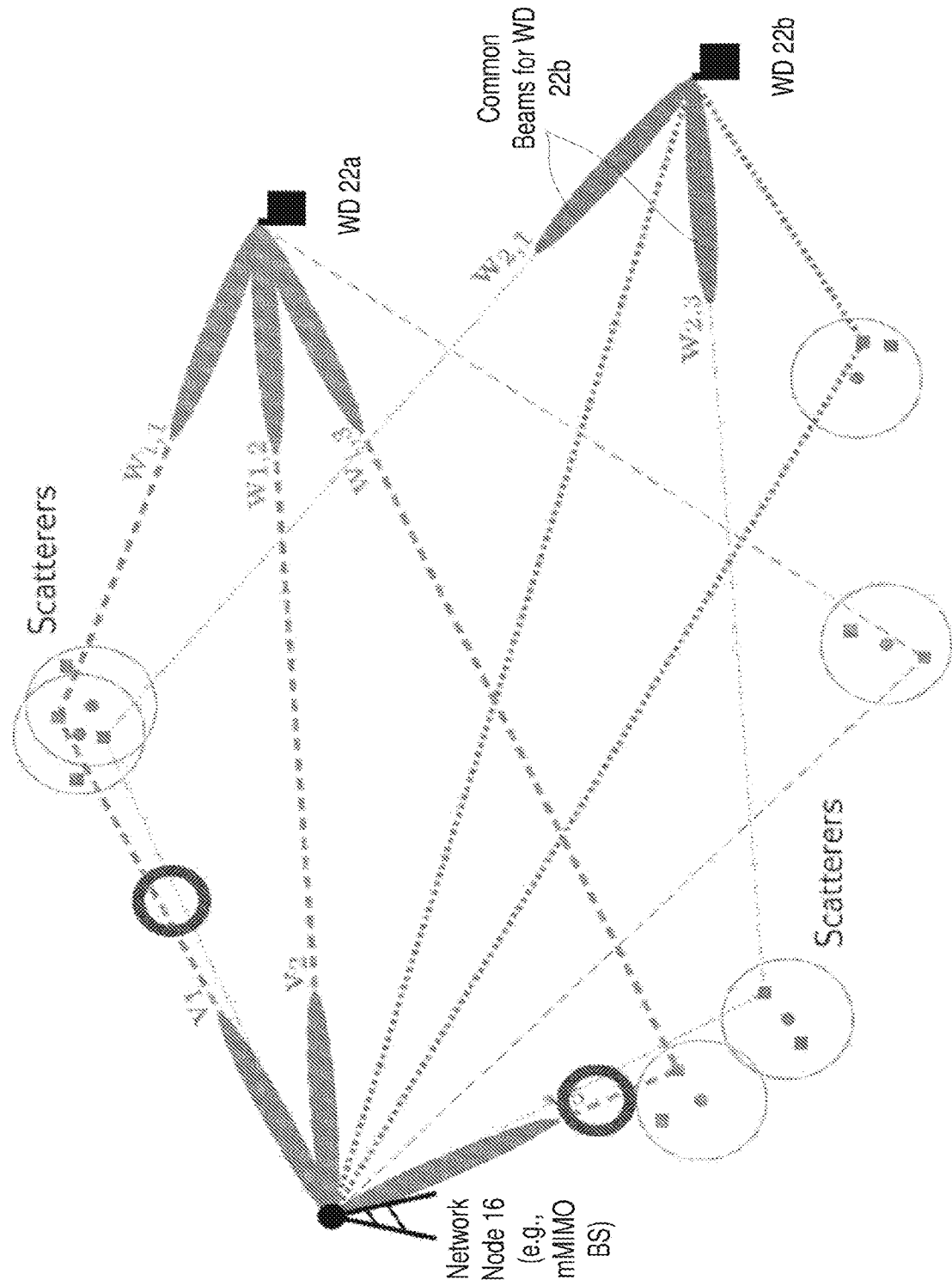
FIG. 17 is a diagram of another example of beam selection according to some embodiments of the present disclosure.

FIG. 16 is a diagram of example beams that can be selected by WDs 22 where WD 22b may select W2,2 and W2,4 as the best beam(s) for itself such as based on one or more of signal strength, gain, etc. WD 22b selecting the beam with the highest gain (e.g., line of sight beam(s)) W2,2 and W2,4 may be the best beam(s) for WD 22b but may lead to high training overhead as all beams used by network node 16 for communicating with WDs 22 need to be trained. However, as shown in another example in FIG. 17, WD 22b may select common beam(s), i.e., beams that are also selected by WD 22a. WD 22b selecting common beams as in FIG. 17 may lead to reduced overhead since less beams are used (i.e., need to be trained) for WD 22a and WD 22b while the common beams still meet a minimum channel gain required by WD 22b and/or network node 16. In one or more embodiments, common beams may include one or more line of sight beams. In one or more embodiments, "training" of one or more beams may refer to the training phase described herein.

Therefore, in one or more embodiments a mechanism at the WD 22 side, i.e., implemented by the WD 22, is provided which enables the multi-antenna WDs 22 to opt for the best combining beam to use for data transmission when training overhead is considered in the mMIMO regime, thereby helping at least in part improve Multi-User MIMO transmission for FDD mMIMO systems under the GoB assumption.

SOME EXAMPLES

Embodiment A1. A network node 16 configured to communicate with a wireless device 22 (WD 22), the network node 16 configured to, and/or comprising a radio interface 62 and/or comprising processing circuitry 68 configured to:
receive beam information from the wireless device 22; and
determine a Grid-of-Beams (GoB) precoder based at least in part on the received beam information.

Embodiment A2. The network node 16 of Embodiment A1, wherein the radio interface 62 and/or processing circuitry 68 is further configured to, during a coherence time, alternate between a training phase and a data communication phase;
the training phase includes transmitting precoded training sequences and receiving reports of an estimated effective channel based at least in part on the precoded training sequences; and
the data communication phase includes transmitting data symbols associated with a data precoder based at least in part on the reported estimated effective channel.

Embodiment A3. The network node 16 of Embodiment A1, wherein the network node 16 is configured to operate in a frequency division duplex (FDD) massive Multiple-Input and Multiple-Output (mMIMO) configuration; and
the beam information includes a precoding matrix index (PMI).

Embodiment B1. A method implemented in a network node 16 configured to communicate with a wireless device 22, the method comprising:
receiving beam information from the wireless device 22; and
determining a Grid-of-Beams (GoB) precoder based at least in part on the received beam information.

Embodiment B2. The method of Embodiment B1, further comprising, during a coherence time, alternating between a training phase and a data communication phase;
the training phase includes transmitting precoded training sequences and receiving reports of an estimated effective channel based at least in part on the precoded training sequences; and
the data communication phase includes transmitting data symbols associated with a data precoder based at least in part on the reported estimated effective channel.

Embodiment B3. The method of Embodiment B1, wherein the network node 16 is configured to operate in a frequency division duplex (FDD) massive Multiple-Input and Multiple-Output (mMIMO) configuration; and
the beam information includes a precoding matrix index (PMI).

Embodiment C1. A wireless device 22 (WD 22) configured to communicate with a network node 16, the WD 22 configured to, and/or comprising a radio interface 62 and/or processing circuitry 68 configured to perform beam selection based at least in part on beam information received via device-to-device communications.

Embodiment C2. The WD 22 of Embodiment C1, wherein the radio interface 62 and/or processing circuitry 68 is further configured to:
communicate the beam selection to the network node 16; and
receive a precoded reference signal that is based on the communicated beam selection.

Embodiment C3. The WD 22 of Embodiment C1, wherein the radio interface 62 and/or processing circuitry 68 is further configured to, during a coherence time, alternate between training phase and data communication phase;
the training phase includes receiving precoded training sequences and reporting an estimated effective channel based at least in part on the precoded training sequences; and
the data communication phase includes receiving data symbols associated with a data precoder based at least in part on the reported estimated effective channel.

Embodiment D1. A method implemented in a wireless device 22 that is configured to communicate with a network node 16, the method comprising performing beam selection based at least in part on beam information received via device-to-device communications.

Embodiment D2. The method of Embodiment D1, further comprising:
communicating the beam selection to the network node 16; and
receiving a precoded reference signal that is based on the communicated beam selection.

Embodiment D3. The method of Embodiment D1, further comprising, during a coherence time, alternating between training phase and data communication phase;
the training phase includes receiving precoded training sequences and reporting an estimated effective channel based at least in part on the precoded training sequences; and
the data communication phase includes receiving data symbols associated with a data precoder based at least in part on the reported estimated effective channel.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:
  BS Base Station
  CCT Channel Coherence Time
  CSI Channel State Information
  CSI-RS Channel State Information-Reference Signals
  D2D Device-to-device
  FDD Frequency Division Multiplexing
  GoB Grid-of-Beams
  MIMO Multiple Input Multiple Output
  mMIMO Massive MIMO
  MMSE Minimum Mean Square Error
  MRC Maximum Ratio Combining
  MU-MIMO Multi-User MIMO
  NR New Radio (5G 3GPP standard)
  PMI Precoding Matrix Index
  SNR Signal-to-Noise Ratio
  SINR Signal to Interference plus Noise Ratio
  SU-MIMO Single-User MIMO
  TDD Time Division Duplex
  UE User Equipment
  ZF Zero-Forcing It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A first wireless device comprising:
   processing circuitry configured to:
      determine first beam information based at least in part on second beam information received from a second wireless device via device-to-device communications, the first beam information indicating a first beam selected by the first wireless device for downlink wireless communications, the second beam information indicating a second beam selected by the second wireless device for downlink wireless communications, wherein the first beam information and the second beam information correspond to respective precoding matrix indicators, wherein the determination of the first beam information is based at least in part on third beam information received from a third wireless device via device-to-device communications, the third beam information indicating at least one beam selected by the third wireless device for wireless communications, and wherein a grid of beams precoder is based at least in part on the third beam information; and
      cause transmission of the first beam information for grid of beams precoder determination.

2. The first wireless device of claim 1, wherein the first beam information includes at least one of an effective covariance, a rank indication and index of beam codebook.

3. The first wireless device of claim 1, wherein the determination of the first beam information is based at least in part on a selection criteria that includes at least one of:
   a minimum channel gain associated with a beam;
   avoidance of multi-user interference compared to at least one other beam;
   maximize signal-to-interference noise ratio compared to at least one other beam; and
   a reduced in beam training overhead compared to at least one other beam.

4. The first wireless device of claim 1, wherein the processing circuitry is further configured to:
   receive at least one precoded training sequence that is based at least in part on the grid of beams precoder, the grid of beams precoder being based at in part on the first beam information and second beam information;
   estimate an effective channel between the first wireless device and a network node based at least in part on the received at least one precoded training sequence; and
   report the estimated effective channel to the network node for Multiple-Input Multiple-Output (MIMO) data precoder determination.

5. The first wireless device of claim 4, wherein the receiving of the precoded training sequence and the reporting of the estimated effective channel are performed during a predefined channel coherence time period.

6. The first wireless device of claim 5, wherein the first beam information is determined during a predefined beam coherence time period different from the predefined channel coherence time period.

7. A method implemented by a first wireless device, the method comprising:
   determining first beam information based at least in part on second beam information received from a second wireless device via device-to-device communications, the first beam information indicating a first beam selected by the first wireless device for downlink wireless communications, the second beam information indicating a second beam selected by the second wireless device for downlink wireless communications, wherein the first beam information and the second beam information correspond to respective precoding matrix indicators, wherein the determination of the first beam information is based at least in part on third beam information received from a third wireless device via device-to-device communications, the third beam information indicating at least one beam selected by the third wireless device for wireless communications, and wherein a grid of beams precoder is based at least in part on the third beam information; and causing transmission of the first beam information for grid of beams precoder determination.

8. The method of claim 7, further comprising:
receiving at least one precoded training sequence that is based at least in part on the grid of beams precoder, the grid of beams precoder being based at in part on the first beam information and second beam information;
estimating an effective channel between the first wireless device and a network node based at least in part on the received at least one precoded training sequence; and
reporting the estimated effective channel to the network node for Multiple-Input Multiple-Output (MIMO) data precoder determination.

9. A network node in communication with a plurality of wireless devices, the network node comprising:
processing circuitry configured to:
receive first beam information from a first wireless device of the plurality of wireless devices, the first beam information being based at least in part on second beam information associated with a second wireless device of the plurality of wireless devices, wherein the first beam information and second beam information corresponds to respective pre-coding matrix indicators;
receive the second beam information from the second wireless device;
determine a grid of beams precoder based at least in part on the first beam information and the second beam information; and
during a coherence time, alternate between training phase and data communication phase, the training phase includes receiving precoded training sequences and reporting an estimated effective channel based at least in part on the precoded training sequences, and the data communication phase includes receiving data symbols associated with a data precoder based at least in part on the reported estimated effective channel.

10. The network node of claim 9, wherein the first beam information includes at least one of an effective covariance, a rank indication and index of beam codebook.

11. The network node of claim 9, wherein the first beam information is based at least in part on a selection criteria includes at least one of:
a minimum channel gain associated with a beam;
avoidance of multi-user interference compared to at least one other beam;
maximize signal-to-interference noise ratio compared to at least one other beam; and
a reduced in beam training overhead compared to at least one other beam.

12. The network node of claim 9, wherein the processing circuitry is further configured to:
cause transmission of at least one precoded training sequence that is based at least in part on the grid of beams precoder;
receive an estimate of an effective channel between the first wireless device and the network node that is based at least in part on the at least one precoded training sequence;
receive a report of the estimated effective channel; and
determine a Multiple-Input Multiple-Output (MIMO) data precoder based at least in part on the report of the estimated effective channel.

13. The network node of claim 12, wherein the transmission of the precoded training sequence and the receiving of reporting of the estimated effective channel occur during a predefined channel coherence time period.

14. The network node of claim 9, wherein the first beam information is based at least in part on third beam information associated with a third wireless device, the third beam information indicating at least one beam selected by the third wireless device for wireless communications.

15. The network node of claim 14, wherein the processing circuitry is further configured to receive the third beam information from the third wireless device; and
the grid of beams precoder being based at least in part on the third beam information.

16. A method implemented in a network node that is in communication with a plurality of wireless devices, the method comprising:
receiving first beam information from a first wireless device of the plurality of wireless devices, the first beam information being based at least in part on second beam information associated with a second wireless device of the plurality of wireless devices, wherein the first beam information and the second beam information correspond to respective precoding matrix indicators;
receiving the second beam information from the second wireless device;
determining a grid of beams precoder based at least in part on the first beam information and the second beam information; and
during a coherence time, alternating between training phase and data communication phase, the training phase includes receiving precoded training sequences and reporting an estimated effective channel based at least in part on the precoded training sequences, and the data communication phase includes receiving data symbols associated with a data precoder based at least in part on the reported estimated effective channel.

17. The method of claim 16, further comprising:
causing transmission of at least one precoded training sequence that is based at least in part on the grid of beams precoder;
receiving an estimate of an effective channel between the first wireless device and the network node that is based at least in part on the at least one precoded training sequence;
receiving a report of the estimated effective channel; and
determining a Multiple-Input Multiple-Output (MIMO) data precoder based at least in part on the report of the estimated effective channel.

* * * * *